United States Patent
Jifroodian-Haghighi et al.

(10) Patent No.: US 9,465,792 B2
(45) Date of Patent: Oct. 11, 2016

(54) COMPUTER AUTOMATED ORGANIZATION GLOSSARY GENERATION SYSTEMS AND METHODS

(71) Applicants: Puntis Jifroodian-Haghighi, Sunnyvale, CA (US); Johannes Heidecke, Karlsruhe (DE); Yvonne Baur, Palo Alto, CA (US)

(72) Inventors: Puntis Jifroodian-Haghighi, Sunnyvale, CA (US); Johannes Heidecke, Karlsruhe (DE); Yvonne Baur, Palo Alto, CA (US)

(73) Assignee: SUCCESSFACTORS, INC., So. San Francisco, CA (US)

(*) Notice: Subject to any disclaimer, the term of this patent is extended or adjusted under 35 U.S.C. 154(b) by 9 days.

(21) Appl. No.: 14/586,458

(22) Filed: Dec. 30, 2014

(65) Prior Publication Data
US 2016/0188566 A1      Jun. 30, 2016

(51) Int. Cl.
*G06F 17/27* (2006.01)
*G09B 5/02* (2006.01)

(52) U.S. Cl.
CPC ....... *G06F 17/2735* (2013.01); *G06F 17/2785* (2013.01); *G09B 5/02* (2013.01)

(58) Field of Classification Search
CPC .. G06F 17/2735; G06F 17/2785; G09B 5/02
USPC ...... 704/1, 2, 4, 9, 205, 224, 227, 239, 240, 704/245, 253–258
See application file for complete search history.

(56) References Cited

U.S. PATENT DOCUMENTS

| | | | |
|---|---|---|---|
| 6,684,201 B1* | 1/2004 | Brill | G06F 17/27 706/45 |
| 2006/0047629 A1* | 3/2006 | Gabbert | G06F 17/30595 |
| 2014/0229160 A1* | 8/2014 | Galle | G06F 17/27 704/9 |
| 2014/0258301 A1* | 9/2014 | Misra | G06F 17/30731 707/739 |
| 2015/0234847 A1* | 8/2015 | Janssen | G06F 17/30106 707/722 |

OTHER PUBLICATIONS

U.S. Appl. No. 14/586,246, filed Dec. 30, 2014, entitled "Computer Automated Learning Management Systems and Methods," inventors: Cirrus Shakeri, Tarek Auel, and Hartmut Vogler.
U.S. Appl. No. 14/586,374, filed Dec. 30, 2014, entitled "Computer Automated Learning Management Systems and Methods," inventors: Cirrus Shakeri, Hartmut Vogler, and Yvonne Baur.
U.S. Appl. No. 14/586,513, filed Dec. 30, 2014, entitled "Computer Automated Learning Management Systems and Methods," inventors: Cirrus Shakeri, Hartmut Vogler, Puntis Jifroodian-Haghighi, and Yvonne Baur.

* cited by examiner

*Primary Examiner* — Marcellus Augustin
(74) *Attorney, Agent, or Firm* — Fountainhead Law Group P.C.

(57) ABSTRACT

The present disclosure includes techniques pertaining to computer automated learning management systems and methods. In one embodiment, a system is disclosed where information is represented in a learning graph. In one embodiment, a framework may be used to access different algorithms for identifying customized learning content for a user. In another embodiment, the present disclosure includes techniques for analyzing content and incorporating content into an organizational glossary.

20 Claims, 20 Drawing Sheets

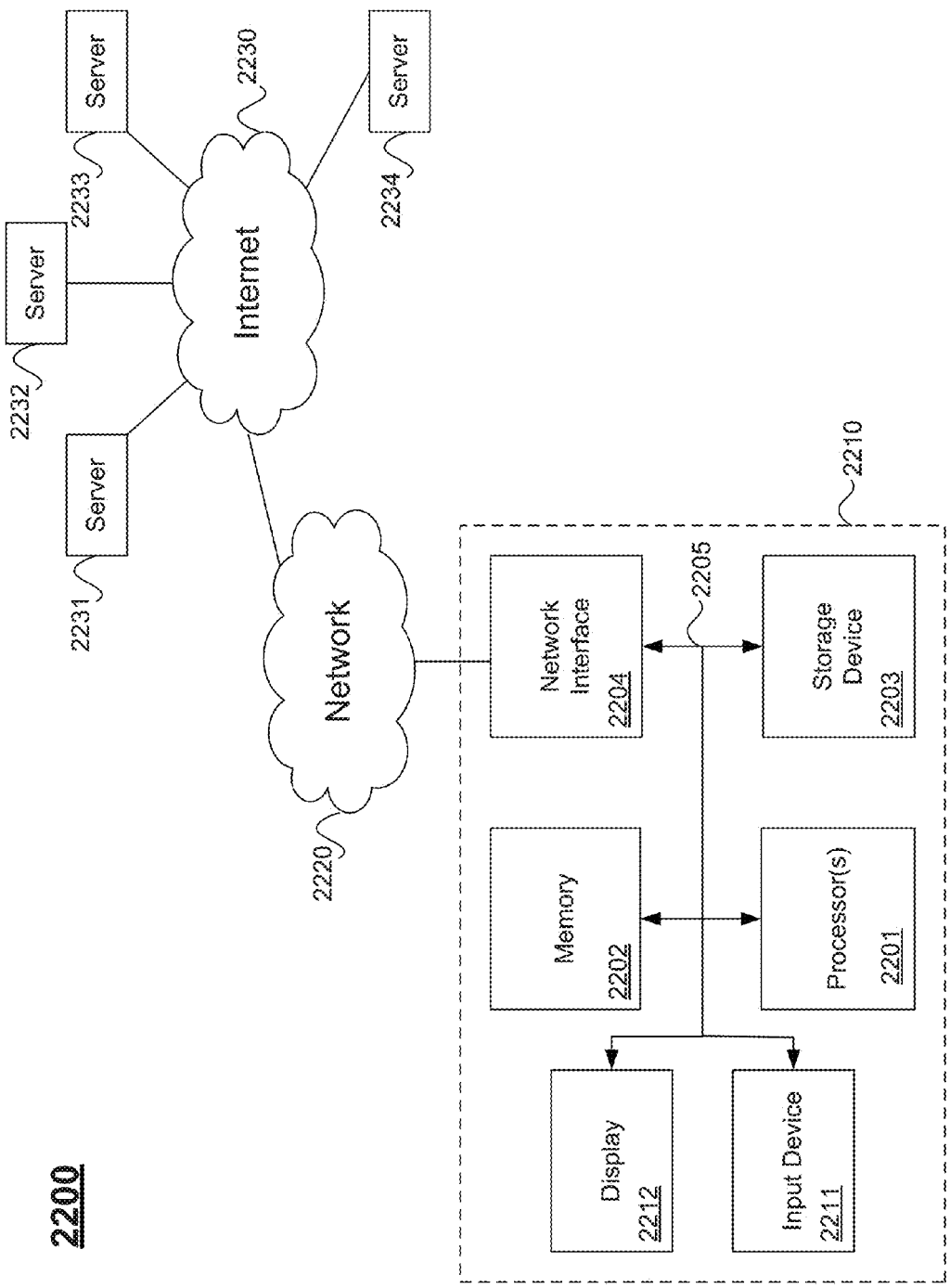

COMPUTER AUTOMATED ORGANIZATION GLOSSARY GENERATION SYSTEMS AND METHODS

BACKGROUND

The present disclosure relates to computing and data processing, and in particular, to computer automated learning management systems and methods.

One of the key factors in individual and organizational success is the ability of individuals to learn. For an organization, enabling employee learning can result in enormous success across all areas of operation. Similarly, it may be desirable to facilitate learning, and also to find company-specific literature, answer questions, and tag and retrieve content for an organizational glossary.

Traditionally, employee learning was limited to colleges, universities, employee self-motivation, and "on-the-job training," all of which was typically limited. Some modern learning systems track learning for determining promotions or to ensure compliance of particular organizational functions—i.e., to ensure people performing particular job functions have the appropriate training and/or certifications to perform the jobs and tasks they are assigned. Accordingly, compliance based learning systems are typically restrictive, static, and simplistic—e.g., employee X cannot do task Y unless they have completed course M; job function Z requires at least degree A.

Traditional approaches of learning are inherently limiting in terms of reaction times to new trends, employee reach, and availability of content. Human resource departments need help shifting from a planner and administrator to a curator role. However, internal content is expensive to produce and becomes obsolete fast. Maintaining relevant content becomes a technical and administrative problem, especially if the system is to be automated and highly customized for individual users.

Another problem pertaining to the advancement of automated learning is that employees often do not know what they need to learn. Furthermore, even if they have an idea of what they need to learn, they often cannot easily find the learning content (e.g., courses, articles, etc. . . . ) required to learn it. Compounding the complexity of the problem, computerized identification of relevant learning content, and the presentation of such learning content to individuals in an organization in a highly customized and efficient manner, requires analysis and organization of large amounts of seemingly unrelated elements of data. With existing technology, computational costs are likely high, and meaningful results are likely uncertain.

Thus, it would be desirable to have a computationally efficient mechanism for enabling a highly customized computer automated learning system for individuals in an organization.

SUMMARY

The present disclosure includes techniques pertaining to computer automated learning management systems and methods. In one embodiment, a system is disclosed where information is represented in a learning graph. In one embodiment, a framework may be used to access different algorithms for identifying customized learning content for a user. In another aspect, the present disclosure includes techniques for analyzing content and incorporating content into an organizational glossary.

The following detailed description and accompanying drawings provide a better understanding of the nature and advantages of the present disclosure.

BRIEF DESCRIPTION OF THE DRAWINGS

FIG. 22 illustrates hardware of a special purpose computing machine configured with a process according to the above disclosure.

DETAILED DESCRIPTION

Described herein are techniques for computer automated learning management systems and methods. The apparatuses, methods, and techniques described below may be implemented as a computer program (software) executing on one or more computers. The computer program may further be stored on a tangible non-transitory computer readable medium, such as a memory or disk, for example. A computer readable medium may include instructions for performing the processes described below. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1:
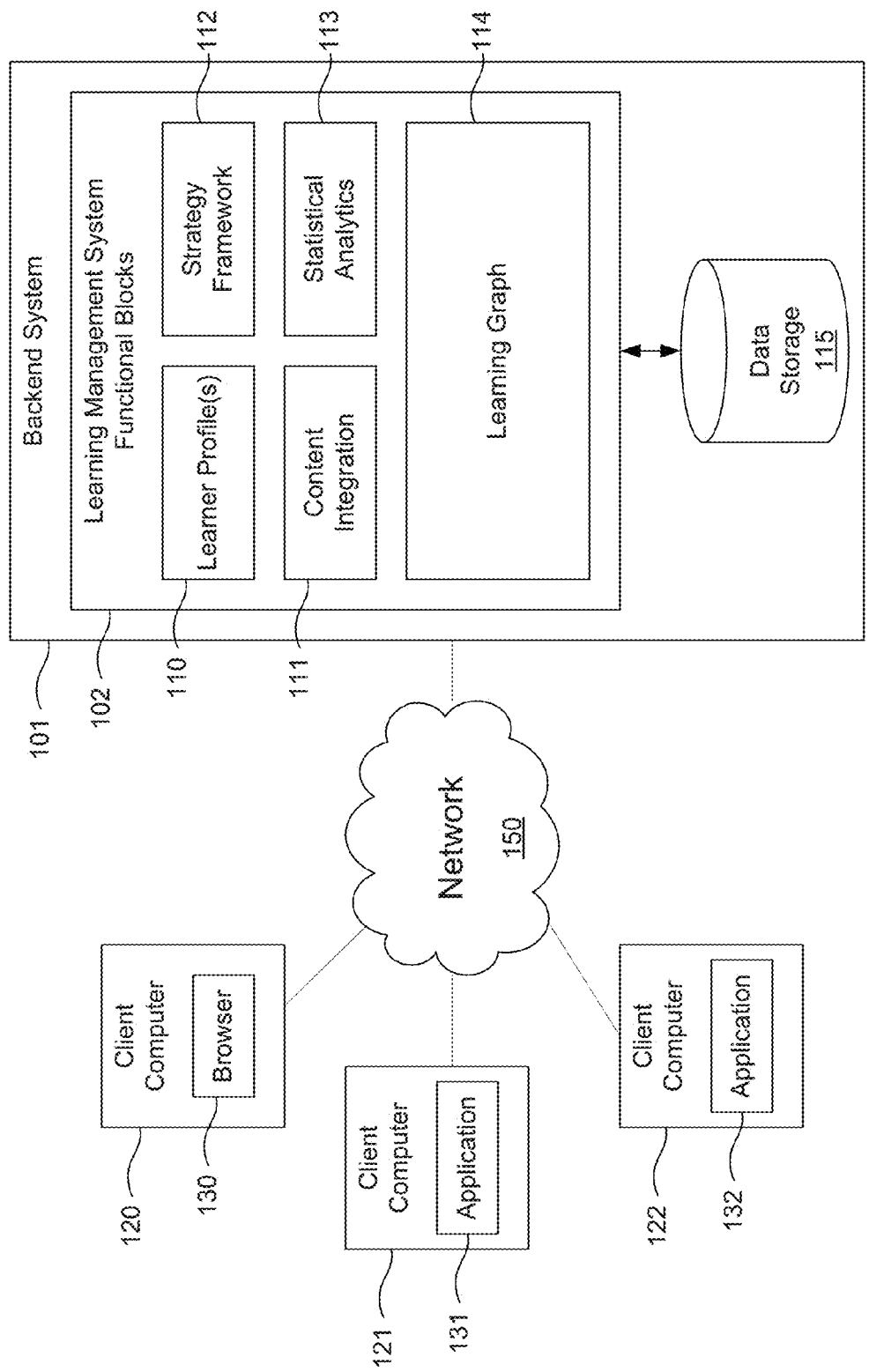
FIG. 1 illustrates an architectural block diagram of a computer automated learning management system according to one embodiment.

FIG. 1 illustrates an architectural block diagram of a computer automated learning management system according to one embodiment. Features and advantages of the present disclosure include a number of techniques and innovations pertaining to computer algorithms and systems that can automate the connection of a large number of users (e.g., in an organization) and a large amount of highly customized content to promote learning of each user.

In a rapidly changing business environment, it is becoming increasingly important to help all employees stay on top of their profession. Embodiments of the present disclosure aim to get more employees to enroll in and finish trainings that will help them do their job better to help every employee stay competitive in the market. Aspects of the disclosure may show users in an organization personalized learning content, as well as trends and their blind spots for their learning areas, both from within an internal catalog as well as from external sources retrieved by and integrated into the system. Embodiments of a computerized system may make better use of the vast amount of relevant, current, and cheap content that exists outside the established channels to keep up with the pace of innovation, avoid obsolete or irrelevant content and reduce internally produced content to strategic areas, for example, to help human resource/learning departments and learners together become curators of content.

As illustrated in FIG. 1, a computer automated learning management system may include a number of different components. In some embodiments, users may interact with the system using client computers 120, 121, and 122. Client computers may include desktop computers, laptop computers, tablet computers, mobile computers (such as smartphones) or any of a wide range of computing devices for interacting with data and other types of information. For example, some embodiments may include an application (or "App") 132 running on a client computer 122 (e.g., a mobile device, such as a smart phone). Other example embodiments may include a browser 130 running on a client computer 120, such as a desktop computer or tablet, for example. It is to be understood that any combination is possible and the above examples are merely illustrative. Features and advantages of the present system may include an "App" that helps employees stay on top of their profession by connecting them with other learners, experts, and personalized learning beyond traditional course catalogs which fits their learning goals and situation, for example. Client computer systems may communicate data and other information to and from a "backend" system running on one or more remote server computers (e.g., a cloud computer system or servers in a data center). As used herein, "server computer" includes both physical server computer hardware and/or virtual server computers (a.k.a., virtual machines) operating on server computer hardware. The present techniques may be implemented on one or more virtual machines, for example.

A backend system 101 may execute computer code to automate the learning system's algorithms and processes. Functional components of one example computer automated learning management system 102 may include learner profiles files 110, content integration 111, a strategy framework 112, statistical analysis 113, a learning graph 114, and data storage 115, for example. Learner profiles component 110 may gather learner profile information, content integration component 111 may perform processes to bring new content into the system, strategy framework component 112 may perform various learning strategy algorithms (e.g., predefined content identification strategy algorithms) to identify relevant content for particular users, and statistical analysis component 113 may perform analytics (e.g., including machine learning algorithms) on information in the system to improve the identification of learning content for particular users, for example. Embodiments of the present disclosure may advantageously store information in a learning graph component 114. Users, learning content, content identification strategies, curriculum, and a wide range of other useful information may be included in the learning graph as nodes and edges, for example. A wide range of computer automated learning system operations may be performed on the learning graph to achieve computationally efficient and highly customized results for particular users. Detailed examples and additional description of each of these components is provided in more detail below.

Embodiments of the present disclosure may help organizations be better equipped for rapid changes in the environment by keeping an agile workforce of lifelong learning, thereby saving money through tapping into the vast amounts of learning content that are available outside the organization (e.g., build less internally), for example, and be more efficient in finding that content by utilizing information pertaining to all learners in the organization as curators of content, in addition to a learning department with limited resources, for example. Accordingly, embodiments may extend learning beyond an internal catalog as the system automatically finds top how-to content, events, and classes for users that can help each user access relevant content when they need it. Embodiments described herein may allow users to see learning content they may not be aware of and expand the knowledge of their profession, for example, spot the trends early, and discover their blind spots—e.g., things each user should be learning, but were not aware of, for example. Embodiments may allow users to stay ahead with digests brought to them, adjust their learning schedules to the time users have available—whether in classes or bite-sized learning—and set learning benchmarks that fit their schedules, then track and share their accomplishments with others in the organization.

Learning Graph

Features and advantages of the present disclosure include a learning graph that comprises nodes and edges used to store data and other information to enable particular embodiments of a dynamic learning management system. Example embodiments of a learning graph may include nodes corresponding to individuals in an organization, learning content, learning collections (e.g., curriculum), learning goals, and a variety of other useful information. Edges between the nodes comprise association types defining particular relationships between particular nodes. For example, a person node representing an individual may be connected to a content node representing an item of learning content (e.g., a research paper or a video). The edge between the nodes may have an association type "hasTaken", indicating that the person has consumed (or completed) the learning content. As another example, the edge may have an association type "hasLearningItem" together with an attribute "status,"

where a "completed" status may indicate the content has been consumed or an "in progress" status may indicate the content has been started but not finished.

Embodiments of a learning graph may include nodes of the same type connected together by edges and nodes of different types connected by edges. In some embodiments, association types between nodes may be dependent on the type of nodes the edge connects. Additional example embodiments and data models for edges and nodes in a learning graph are provided in more detail below.

Embodiments of a learning graph may be used to establish learning specific connections with attributes to support dynamic learning of individuals in an organization, for example. Typically, learning goals for individuals were prescribed, or top down, from HR or management. Embodiments of the present disclosure include a system where learning goals are derived from learning patterns of other users and the discovery of new external content and, in some embodiments, how that content is consumed and rated by users. Learning goals for individuals may be derived from similar users with similar job functions or roles in an organization, for example, where a learning path (recommended courses and the sequence of the courses) is produced from an analysis of the learning graph. As described in more detail below, learning content may be stored in the graph as one or more content nodes. Content nodes may include documents, videos, audio courses, blogs, articles, research papers, or a wide variety of other consumable learning content, for example, from data sources such as Twitter®, LinkedIn®, YouTube®, or almost any other electronic source. Connections between nodes may be used to find learning content for particular users as set forth herein.

A learning graph may be used to create learning paths (e.g., curriculum) dynamically and automatically for individual learning as opposed to contemporary prescription techniques. Individuals in an organization will be able to discover, using the computer automated techniques described herein, including the learning graph, what they need to learn for their job functions and/or career goals, and the learning content will be provided to them automatically without burdensome internet searching, for example. Accordingly, certain embodiments may be user driven or "bottom up" approaches to connecting content with users, for example.

In various embodiments, a variety of operations may be performed against a learning graph. For example, the system may determine a user's profile to obtain some context about what type of learner the person is (who am I and what do I want or need to learn), including what content the individual has consumed (learned) in the past and how it was consumed (online, classroom, etc.), who is the individual connected to and how are they connected. Accordingly, the system may derive what are the individual is interested in and provide the user with relevant learning content recommendations, for example. As described in more detail below, user profile information may be stored in the learning graph as well (e.g., as attributes of a person node and as attributes or node types of other related nodes). Profile information relevant to determining relevant learning content may include a user's role in an organization, years on the job (or experience level), skills, performance data, goals (e.g., areas they need to develop or improve), topics they post or message about, connections to other individuals in the organization, and a variety of other information which may be extracted from external modules (e.g., an HR database, talent management database, or social collaboration tool) and stored in the learning graphs as illustrated in certain example implementations described herein.

Figure 2A:
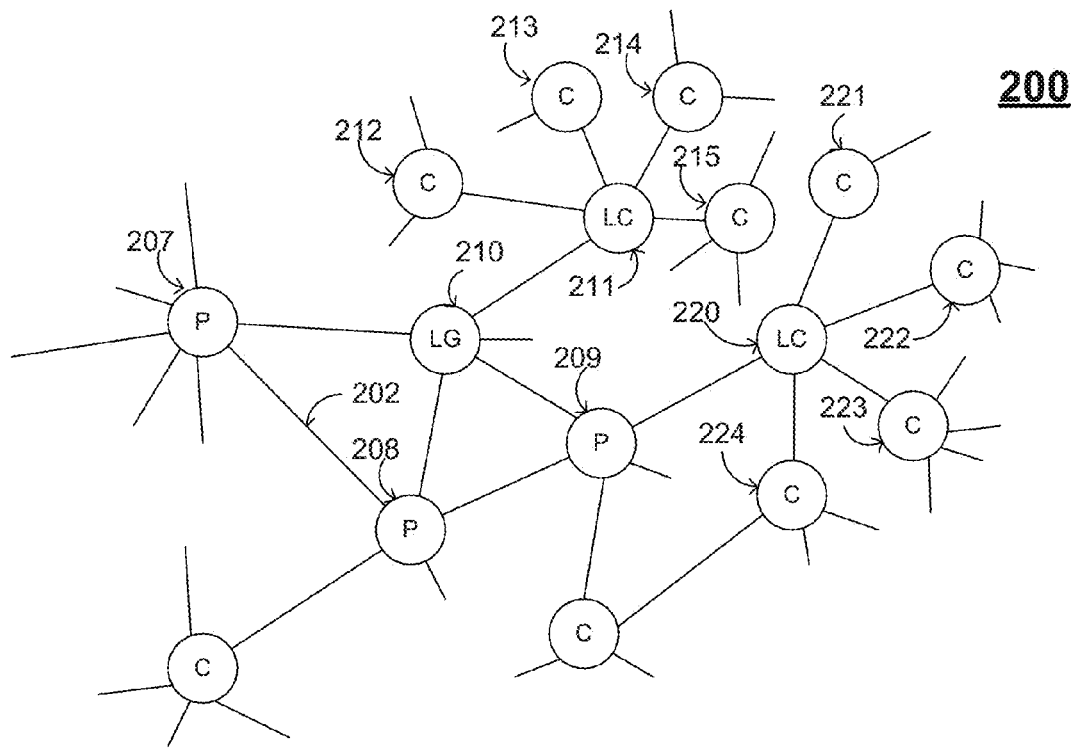
FIG. 2A illustrates an example learning graph according to a particular embodiment.

FIG. 2A illustrates an example learning graph according to a particular embodiment. As shown in FIG. 2A, the learning graph 200 includes nodes (e.g., person node 208) and edges (e.g., edge 202). In this example, there are multiple different types of nodes, including multiple person nodes (labeled "P") representing individuals (e.g., in an organization) and multiple content nodes (labeled "C") representing learning content. In this example, nodes further include learning collection nodes and learning goal nodes. Learning collection nodes (labeled "LC") represent a collection of learning content as a unit (e.g., a curriculum) and have a plurality of edges to a plurality of content nodes. Learning goal nodes have edges to person nodes and may include edges to learning collection nodes, for example, to represent a goal of an individual to consume a compilation of particular learning content, for example. For instance, in this example, person node 209 has an edge to learning collection node 220, and learning collection node 220 has edges to content nodes 221-224. Accordingly, content associated with content nodes 221-224 is part of a particular learning connection 220, which is associated with an individual represented by person node 209 (e.g., has been, or is being, consumed by the individual). Similarly, as another example, individuals represented by person nodes 207-209 may all have the same learning goal 210 (e.g., where all three individuals are new college hires in the same department). Learning goal 210 in turn has an edge to a learning collection node 211, which in turn has edges to content nodes 212-215.

As mentioned above, existing learning system data models are typically simplistic, relational, and inflexible, and data is driven top down by learning departments, such as human resources (learning assignments are handed down). Features and advantages of the present disclosure include a learning graph that is dynamic and which changes over time, where learning content and/or learning collections for particular users are derived. Learning paths, which may represent a sequence of consumption for learning content, may be dynamic and customized for different users based on each user's learning history. In one embodiment, the system may automatically determine particular modes of learning for particular users. For example, if a user has a history of achieving learning goals more effectively by traversing content nodes corresponding to video lectures, the system may automatically determine that the user's preferred mode of learning is by watching videos, and generate recommended learning collections and learning paths to achieve particular learning goals. A different user with a learning history including the consumption of research papers and blogs may achieve the same learning goal by consuming different learning content. In this case, a second instance of the same learning goal may be created, for example, and linked to a particular person, but the second instance of the learning goal would be connected to a different learning collection, for example. Because learning mode determination is based on a user's historical consumed content, as represented in the learning graph, recommended content may adapt over time as user behavior represented in the learning graph changes over time, for example.

In another embodiment, customized content and learning collections (such as a curriculum) are generated for particular users from the learning graph. As described in more detail below, a variety of algorithms (aka learning strategies) may be applied against information embodied in a learning graph to make recommendations about content to be consumed by particular individuals. Particular learning paths may be based on data in the learning graph data model and impacted by what other similar individuals in an organization have done to obtain knowledge, for example.

Figure 2B:
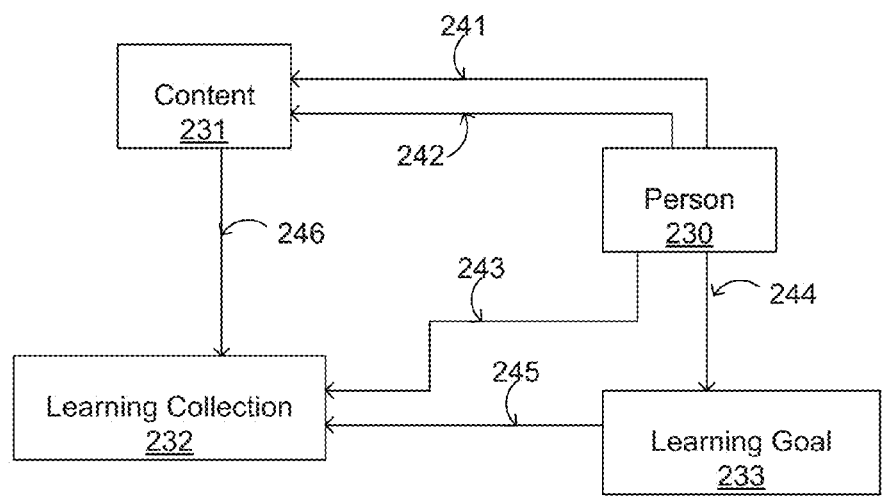
FIG. 2B illustrates one example of a learning graph data model according to an embodiment.

FIG. 2B illustrates one example of a learning graph data model according to an embodiment. In this illustrative example, the elements of a learning graph include person nodes 230, content nodes 231, learning collections 232, and learning goals 233. Person nodes 230 may be coupled to content nodes 231 along one or more edges 241 and 242 defining different association types, including "hasLearningItem(status)" and "hasShared," as examples. Content nodes 231 may be coupled to learning collections nodes 232 by edges 246 specifying an associations type "isinLearningCollection," for example.

In one embodiment, elements of the learning graph data model may be implemented as object classes (or derived classes) in an object oriented programming language such as C++ or Java, for example. As particular nodes or edges of each type are created, instances of each class are created (or instantiated). In some embodiments, both nodes and edges may be dynamic. For example, the system may create new types of edges (connections) at any time, or existing ones may be changed or obtain a different meaning. For instance, the system could introduce a 'has commented on learning" without any delays type for an edge.

As one example application of a learning graph, derivation of a learning path may proceed as follows. The system may start by determining a model of a particular learner. Learning goals for a person node may be extracted from the learning graph. Topic nodes representing topics of interest in an organization (described in more detail below) may be extracted from the learning graph. Learning preferences (how does the particular individual like to learn) may be extracted by examining consumed content nodes (learning history) connected to the user in the learning graph. Similar learners may be captured by examining other person nodes that meet predefined characteristics (e.g., similar attributes or connections in the learning graph). In certain example embodiments, one or more predefined content identification strategy algorithms (or "strategies") may be applied to the learning graph data described above, and other data, to generate customized content and/or curriculum recommendations for a particular individual based on that individuals unique collection of connections and attributes in the learning graph, for example. As time passes and the connections between nodes in the graph change and the association types and attributes around the graph change, the recommendations will also change, creating an adaptive environment for deriving learning content for each user.

Changes in the graph leading to changing content recommendations may include changes in consumed content by the user, changes in connections between the user and other people, changes in profile information (e.g., role in the organization, experience, etc. . . . ), changes in available learning content in the system (e.g., new learning content is included in the learning graph or old content is removed), changes in content consumed by other users (e.g., similar learners or users with similar roles), changes to learning goals, and changes to the content included in particular learning collections, to name just a few examples.

From the examples set forth above, it is evident that a wide range of data about individuals (person nodes), content (content nodes), curriculum (learning collection nodes), learning goals (learning goal nodes), topics (topic nodes), and a wide range of other information useful for computer automated user-customized dynamic learning management may be stored in a learning graph. In various embodiments of the present disclosure, a learning graph stores data underlying the processes/algorithms used to achieve highly customized, dynamic learning recommendations, for example, where the learning graph includes nodes representing and storing data about individuals in an organization, content, learning goals, learning collections, etc. . . . Edges capture relations, and may further store data about such relations, between instances of data represented and/or stored in nodes (not possible in relational database). Nodes in the learning graph may be traversed across edges to produce highly customized learning content recommendations, plans, and/or paths, for example. As users consume learning content, a user's person node may be coupled to the content's content node by an edge (directly or indirectly through a learning collection), and each user's learning history may be determined from the content nodes (or learning collection nodes) coupled to a person node, for example.

Figure 3:
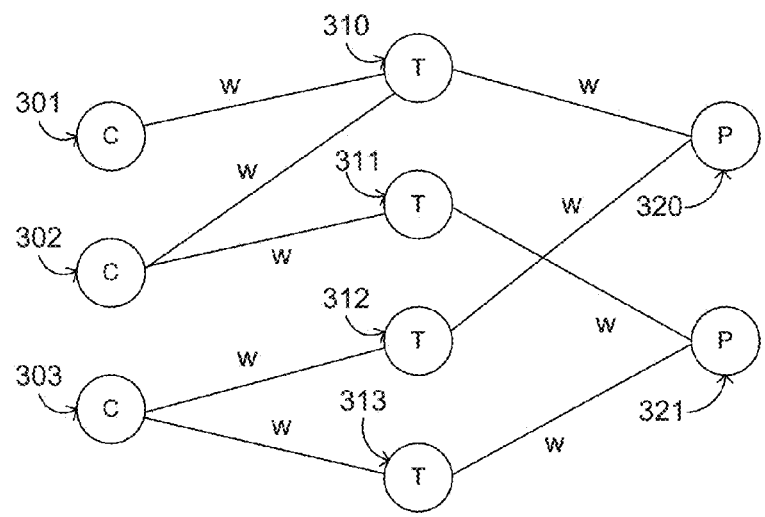
FIG. 3 illustrates the integration of content into a learning graph according to one embodiment.

FIG. 3 illustrates the integration of content into a learning graph according to one embodiment. In one embodiment, new content may be brought into the system by instantiating a content node representing the content and, in some example embodiments, storing the content in the content node. In this example, three items of new content nodes 301, 302, and 303 are created to integrate three (3) items of new content into the learning graph. In some example implementations, documents may be analyzed and key terms that describe the topics of the document may be extracted as described in more detail below. When new content is found to have particular topics that are also existing topic nodes in the learning graph (e.g., a machine learning topic node or an artificial intelligence topic node), content nodes representing the new content are linked by edges to the existing topic nodes. For example, a new content node 301 may correspond to a document that has been analyzed and pertains to Java programming. Accordingly, new content node 301 is instantiated in the learning graph, and content node 301 is coupled to an existing topic node 310 representing the Java programming topic in the learning graph. The Java programming document may be stored in content node 301 in some example implementations. If a user, represented by a person node 320 indicates an interest in Java programming, the system may couple the user's person node 320 to the Java programming topic node 310. Accordingly, as new content about particular topics enters the learning graph, user's person nodes will be coupled to the new content automatically, and such new content may be recommended to a user as part of a predefined content identification strategy algorithm described below, for example. Similarly, a new content item may be a video with a text description including the terms Java programming and Big Data. Thus, a new content node 302 may be created in the learning graph, and edges to Java programming topic node 310 and Big Data topic node 311 may be generated. In this case, a user corresponding to person node 321 has an edge to topic node 311 (expressing some interest or need to learn Big Data), so both users 320 and 321 will be coupled to the new content node 302 in the learning graph. Finally, a third item of content may be a research paper about cybersecurity techniques in application programming. Thus, a new content node 303 may be created in the learning graph, and edges to Cybersecurity topic node 312 and Application Programming topic node 313 may be generated. In this case, users corresponding to person nodes 320 and 321 have edges to topic nodes 312 and 313, respectively, so both users 320 and 321 will be coupled to the new content node 303 in the learning graph.

FIG. 3 also illustrates another aspect of some example embodiments of a learning graph. In this example, the edges between the nodes further comprise weights. Weights may be a measure of association type strength. For example, edges between new content nodes 301-303 and topic nodes 310-313 may have association types "hasRelatedTopic," and the weight may be a measure of how related to the topic the new content item is. Accordingly, a wide range of edge association types may have weights specifying the strength of the relationship between two nodes in the learning graph, for example.

Figure 4:
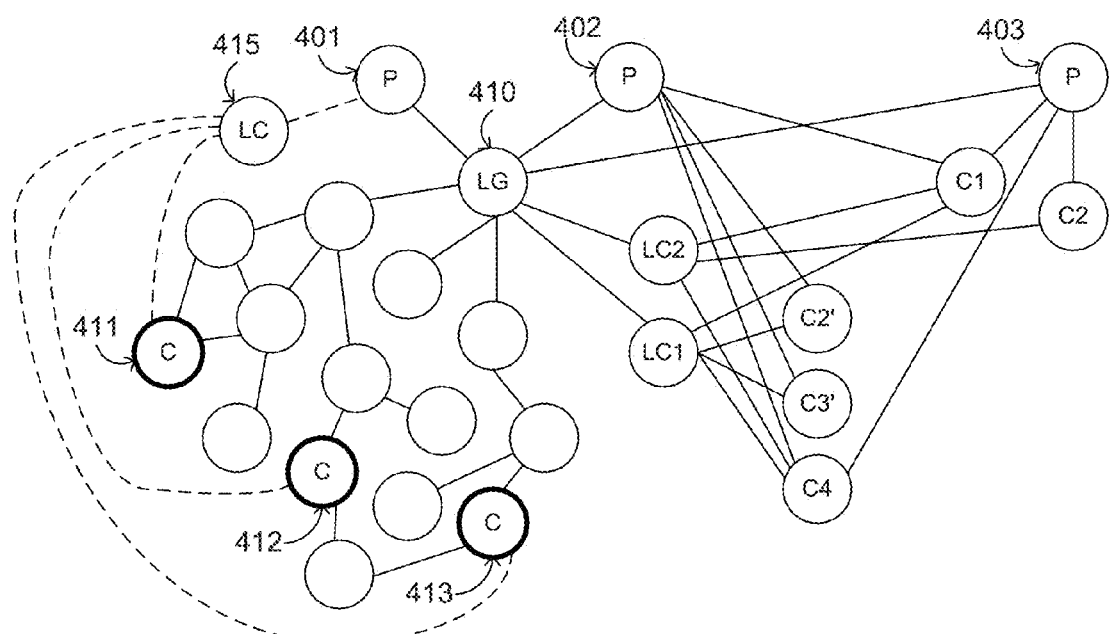
FIG. 4 illustrates deriving a learning path using a learning graph according to an embodiment.

FIG. 4 illustrates deriving a learning path using a learning graph according to an embodiment. Features and advantages of the present disclosure include adaptively deriving, from a learning graph, customized learning paths for person nodes corresponding to individual learners. FIG. 4 illustrates a portion of a learning graph to illustrate the technique generally and further via one specific example. Here, an individual has a corresponding person node 401. The individual may have particular learning goals, for example, and such learning goals may be represented in the learning graph by a learning goal node 410 (e.g., specifying information to be learned) and an edge to person node 401. In some embodiments, the system may traverse the learning graph from a particular person node (e.g., node 401) to a learning goal node (e.g., node 410). From the learning goal node, the system may acquire information about what knowledge the individual is targeting for consumption. Accordingly, the system may traverses nodes and edges in the learning graph to find a plurality of relevant content to the learning goal. In particular embodiments, the system may traverse across multiple nodes and edges based on predefined content identification strategy algorithms (aka, "strategies") described in more detail below. In this example, traversing nodes in the graph according to different strategies, content nodes 411, 412, and 413 may be identified as pertaining to relevant content that may be consumed to meet a learning goal. Accordingly, the relevant content is compiled into a customized learning path. In this example, a new learning collection node 415 is instantiated (e.g., of subtype learning path) together with edges coupling content nodes 411, 412, and 413 to learning collection node 415 and an edge between person node 401 and the new learning collection node 415, for example. Accordingly, in this example, compiling relevant content into the customized learning path may include creating a learning path node in the learning graph (e.g., node 415), creating an edge between the learning path node and each content node corresponding to the relevant content (e.g., nodes 411-413), and coupling the learning path node to the person nodes (e.g., node 401).

As mentioned above, a wide variety of strategies may be used to identify relevant content in the learning graph for a user. In some embodiments, the system may use multiple different algorithms/strategies and combine the results. For example, in one embodiment, a predefined content identification strategy algorithm analyzes nodes and edges in the learning graph. In another embodiment, a predefined content identification strategy algorithm comprises statistical operations applied against data stored in the learning graph. In some embodiments, the innovative graphical analysis algorithms, described herein, are combined with analytic and statistical techniques to produce composite results—lists of content relevant to a learning goal, for example.

As one intuitive example, a user represented by person node 401 may have a learning goal 410 to learn the Java programming language. To derive a customized learning path, the system may examine content associated with other individuals at nodes 402 and 403 who had the same learning goal. Person node 402 is coupled to four Java courses C1, C2', C3', and C4 which are part of a learning collection LC1, where C1 and C4 are classroom course and C2' and C3' are online courses. However, person node 403 is coupled to only three content nodes C1, C2, and C4, which are part of learning collection LC2. In this case, all three courses are classroom courses. The system may analyze the learning history of person node 401 and determine that on-line courses are the preferred mode, and thus recommend learning collection LC1. Alternative learning histories of other users who value speed over delivery mode may result in the recommendation of learning collection LC2, which only has three courses. The above example is merely an intuitive illustrative example of the many graph strategies and uses of learning graph data that may be used to produce customized learning paths for particular users, for example.

FIGS. 5-10 illustrate example implementations of a learning graph data model according to an embodiment. In the following examples, weights may be included on the edges as indications of strength of the connections. An originator of the connection (e.g., text analysis, direct data extraction, apriori algorithm, rule-based inference) and a method by which the weight has been calculated (plus parameter values) may also be recorded. Further, in example implementations, a learning (or knowledge) graph may stores data (and metadata) for understanding a person's context (learner, expert, teacher, etc. . . . ). The learning graph may also store data and metadata about content materials. Other data not related to person's context or contents may remain in an original data source (and may be referenced from the graph if needed) or stored in a temporary table, for example. Embodiments of the learning graph may include data and code. For example, some nodes in the graph may contain rules, scripts, database queries, code, etc. A script or query may run for retrieving data on-the-fly from secondary sources, for example, for automatic maintenance and update of the data, or for encoding domain or business rules. In addition to learning-related data, the graph may also include application configuration data, user session data, etc.

As further illustrated in the examples below, either nodes or edges (or both) may have subtypes and attributes, for example. In some cases, instances of nodes may have multiple subtypes (e.g., a person node may have both subtypes learner and teacher where the person is both learning and teaching).

Figure 5:
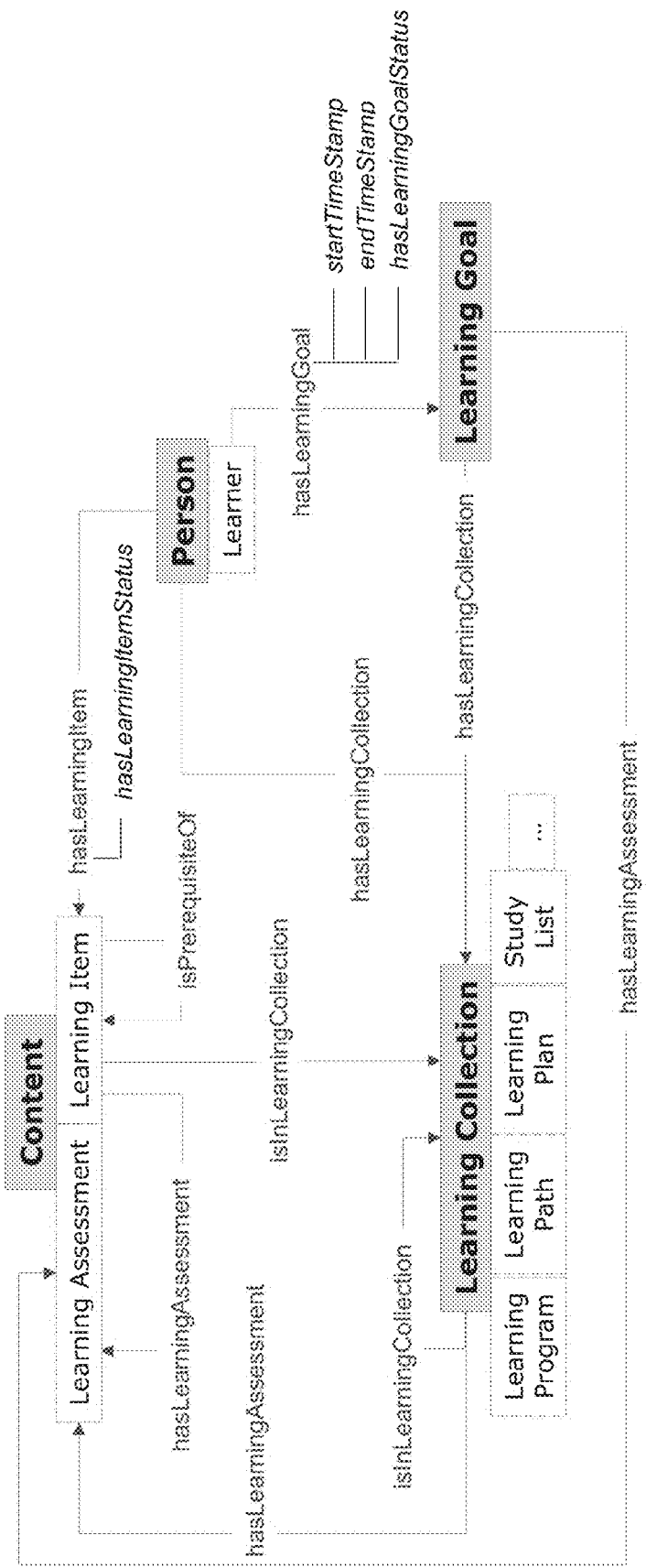
FIG. 5 illustrates an example implementation of a learning graph data model according to an embodiment.

FIG. 5 illustrates an example implementation of a data model for content nodes, person nodes, learning collection nodes, and learning goal nodes. As illustrated in FIG. 5, Content node may have subtypes "Learning Assessment" and "Learning Item," Person node may have subtype "Learner," and Learning Collection node may have subtypes "Learning Program," "Learning Path," Learning Plan," and "Study List," for example. FIG. 5 further illustrates association types for edges between nodes. Additionally, some association types may have attributes as illustrated by start and end time stamps and status for the "hasLearningGoal" association type.

Figure 6:
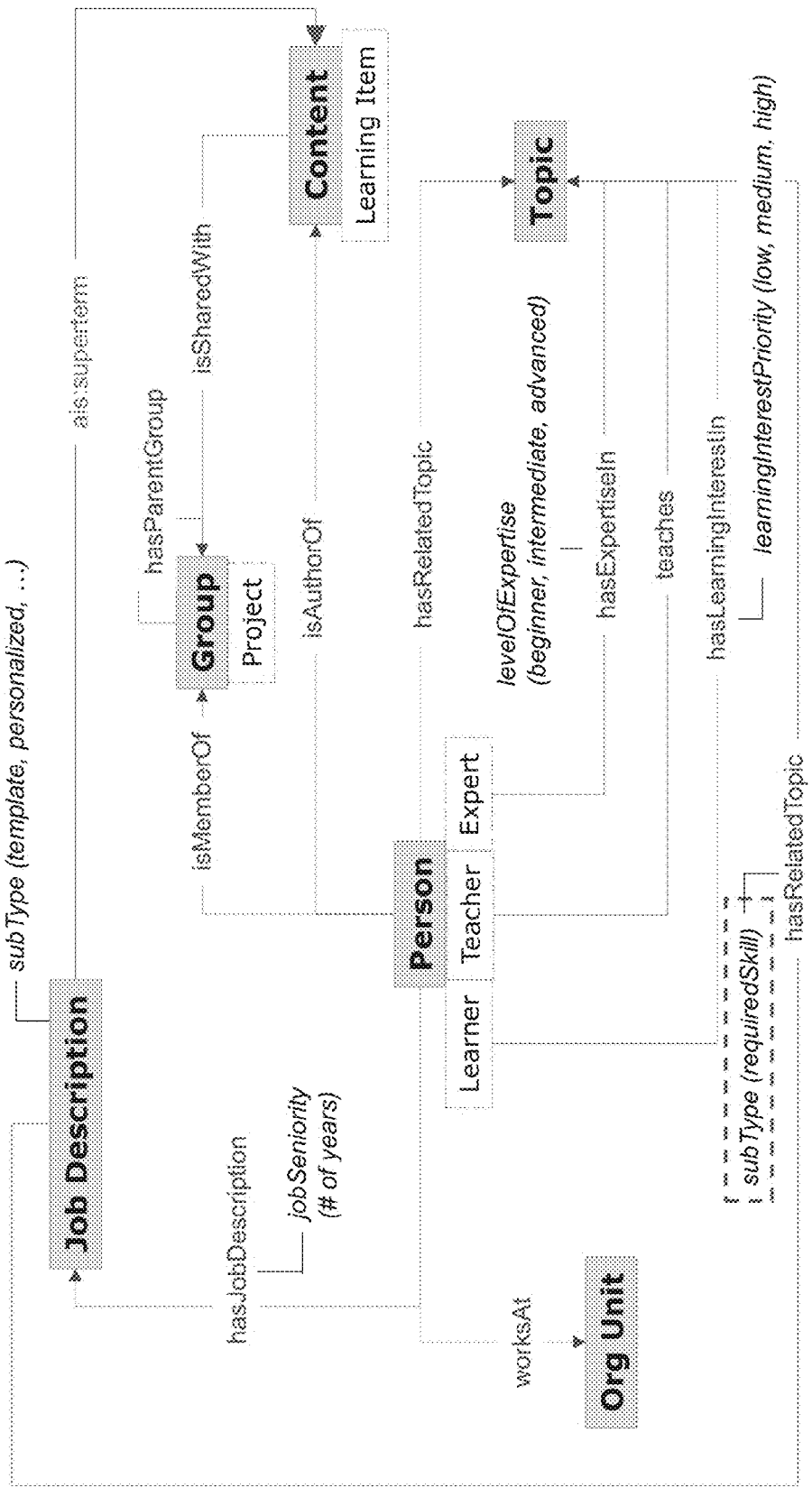
FIG. 6 illustrates a further example implementation of a learning graph data model according to an embodiment.

FIG. 6 illustrates an example implementation of a data model for a person node. In this example, a Person node may be coupled to a Group node, Content node, Topic node, Org Unit node, and Job Description node, for example. Person node may have subtypes Learner, Teacher, Expert, for example. The edge between Job Description node and Topic node illustrates a subtype of the "hasRelatedTopic" edge (e.g., required skill). Edges "hasExpertisein" and "hasLearningInterestin" between Person node and Topic node further illustrate example attributes of edges that may be used in a learning graph data model.

Figure 7:
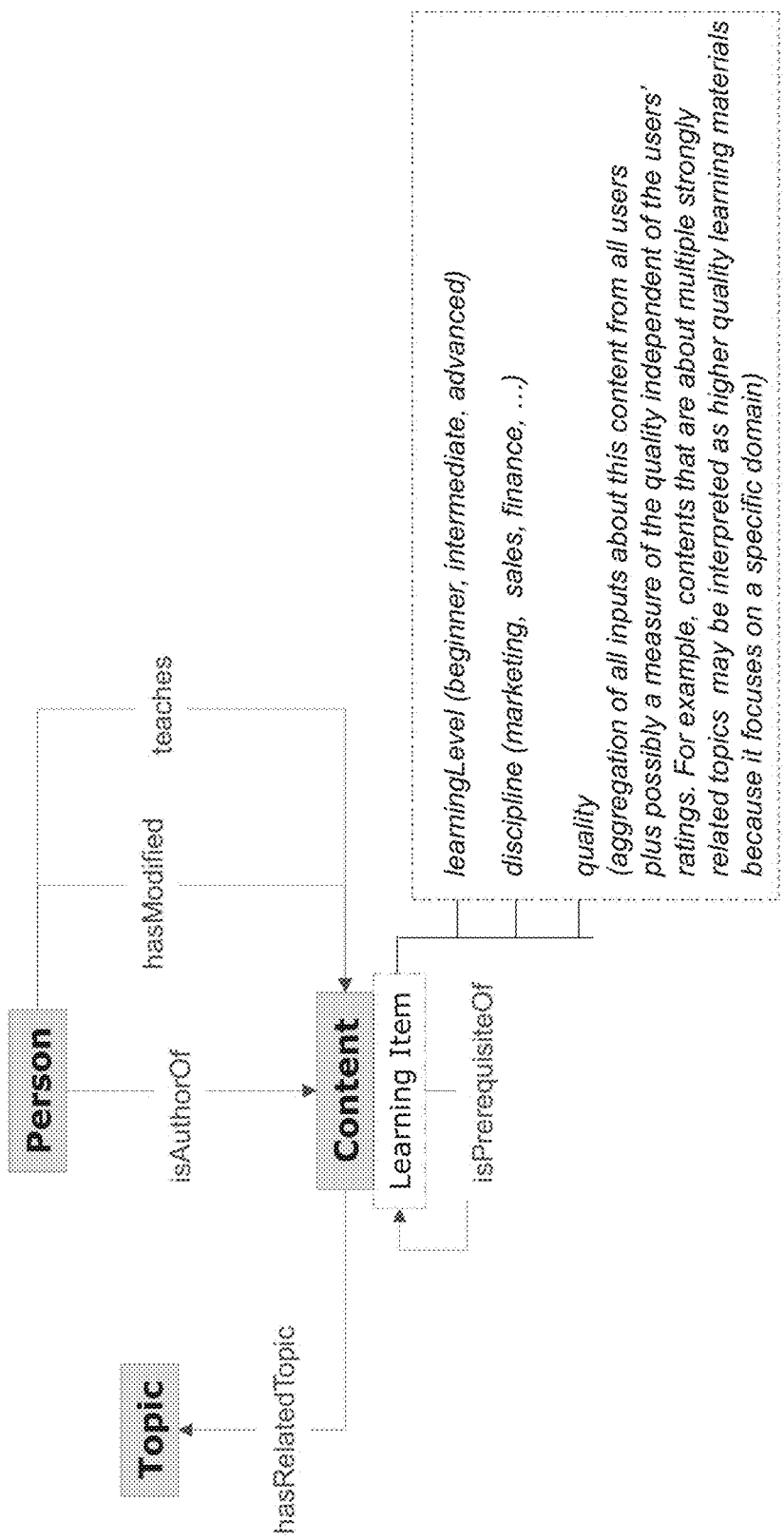
FIG. 7 illustrates a further example implementation of a learning graph data model according to an embodiment.

FIG. 7 illustrates an example implementation of a data model for a content node. In this example, edges between a Content node, Person node, and Topic node are illustrated, where the Content node has a Learning Item subtype and corresponding attributes as shown.

Figure 8:
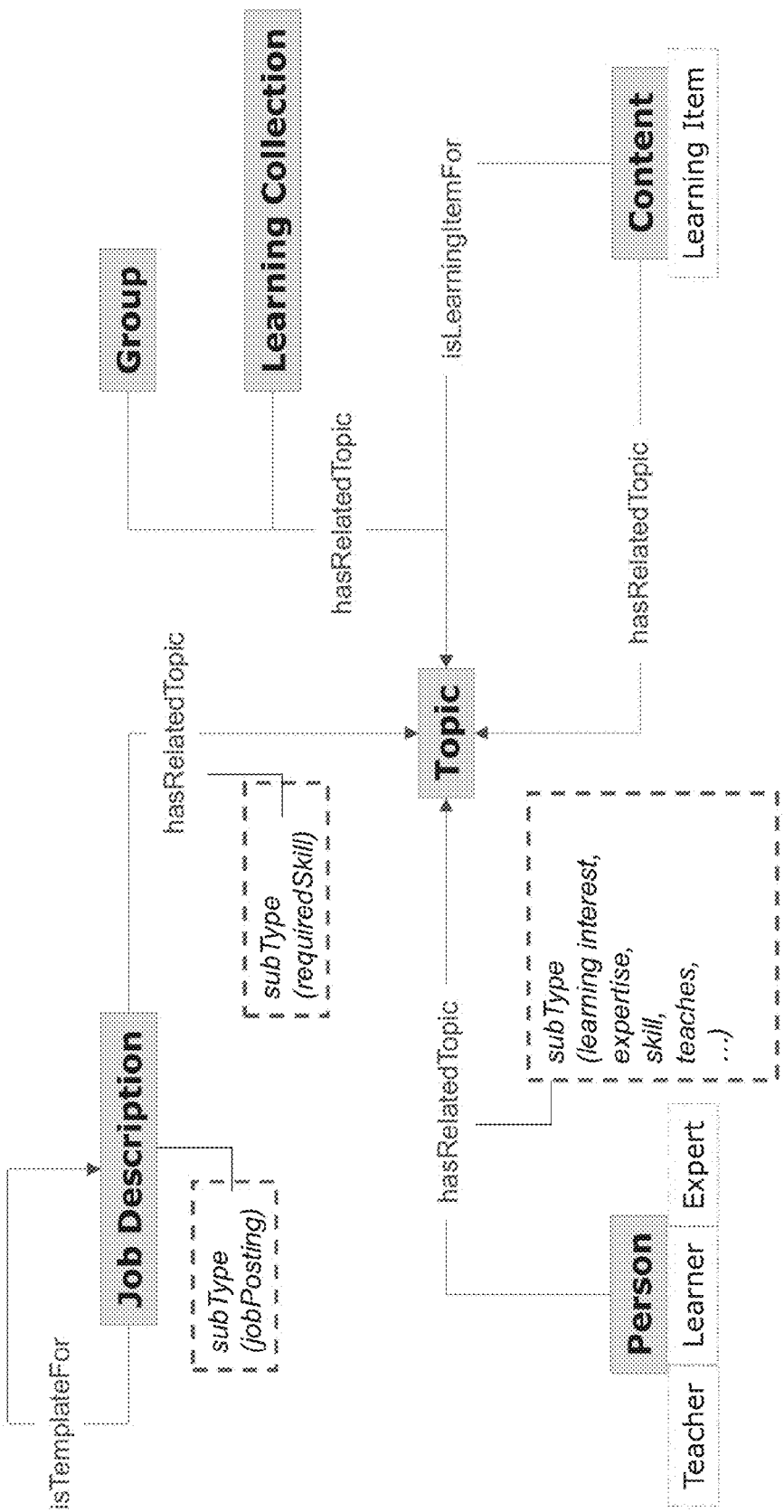
FIG. 8 illustrates a further example implementation of a learning graph data model according to an embodiment.

FIG. 8 illustrates an example implementation of a data model for coupling to a topic node. In this example, a content node, person node, group node, learning collection node, and job description node may have edges coupled to a topic node as shown with different edge subtypes. In some implementations, a topic node may have a subtype "Term." Topics and Terms may establish a two level hierarchy for a taxomony, for example. Example Topic nodes may include Machine Learning, where a Term may be Natural Language Processing, for example. Terms may be determined by text analysis, for example, and may include nouns or verbs. In one embodiment, a Topic is related to a Term by a weight, which allows measure of strength between the Topic and the Term, for example.

Figure 9:
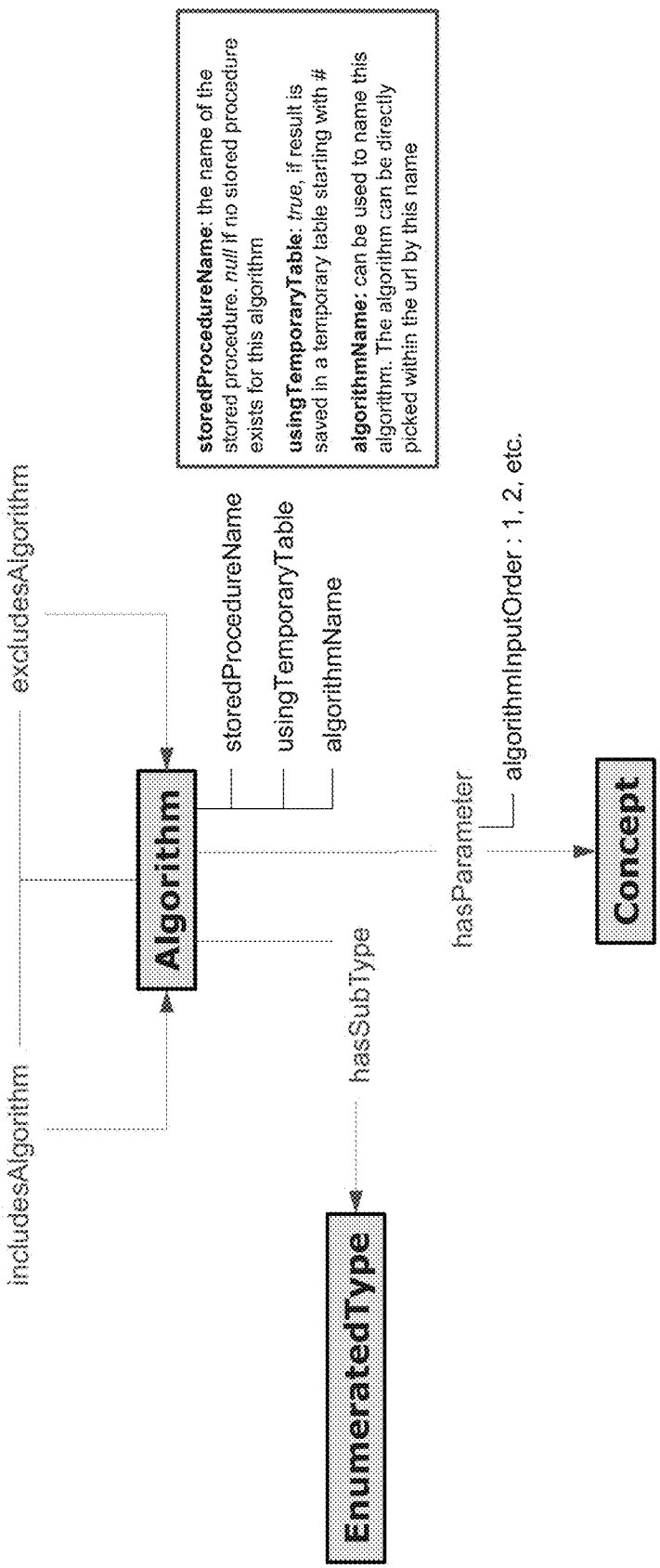
FIG. 9 illustrates a further example implementation of a learning graph data model according to an embodiment.

FIG. 9 illustrates an example implementation of a data model for an algorithm (aka, strategy). Embodiments of the disclosure include predefined content identification strategy algorithms ("strategies"), which may be stored in the learning graph, for example. An algorithm node may have a plurality of subtypes (e.g., Enumerated Types) corresponding to different particular algorithms. Algorithm nodes may be implemented, in whole or in part, as stored procedures, with references to particular stored procedures being included as one or more attributes of the Algorithm node, for example. In this example, the learning graph includes Concept nodes as parameters to an Algorithm node.

Figure 10:
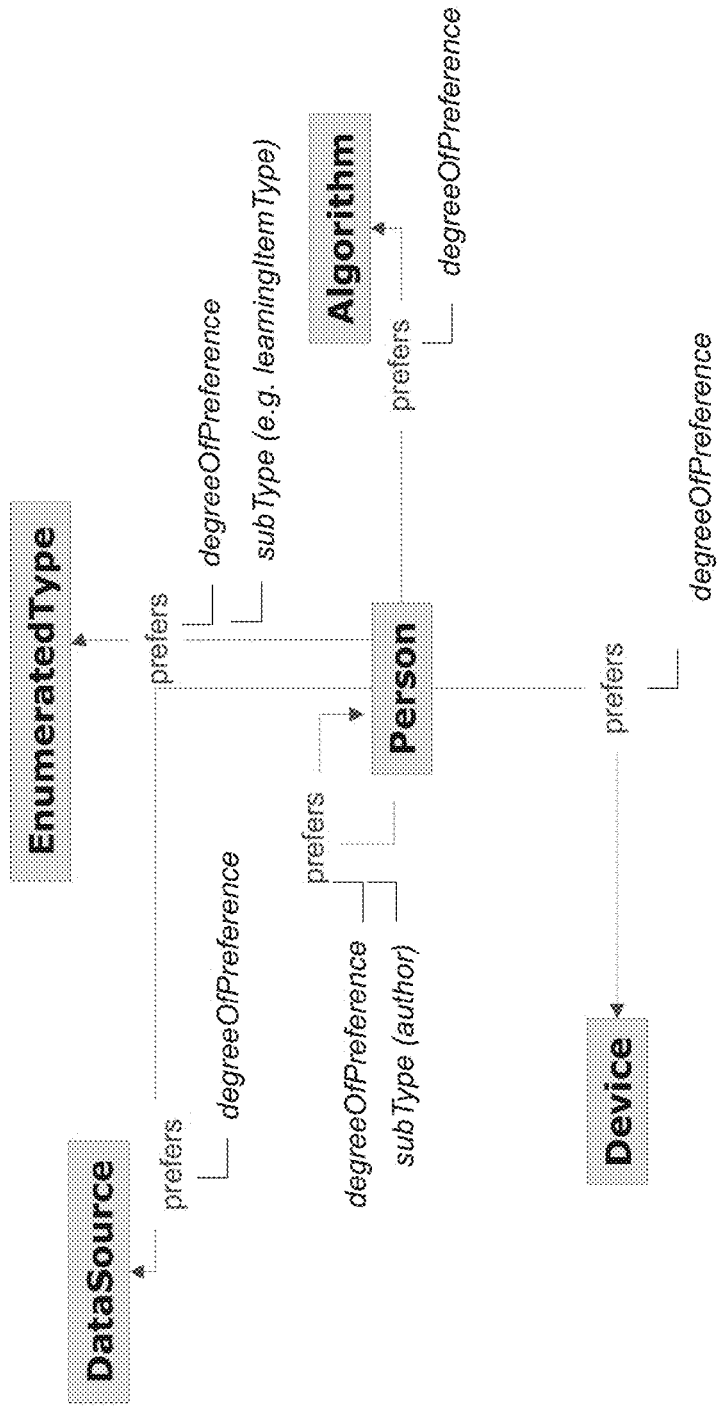
FIG. 10 illustrates a further example implementation of a learning graph data model according to an embodiment.

FIG. 10 illustrates an example implementation of a data model for capturing user preferences. Embodiments of the disclosure may include algorithms for linking nodes with edges having "preference" association types, which may include weights (e.g., degreeOfPreference). In this example, a person node is coupled to other person nodes, algorithm nodes, device nodes (e.g., for a user with multiple computing devices), enumerated type nodes (e.g., used to represent types of content such as discussion, post, external source, etc.), and data source nodes (e.g., preferred sources of information such as Twitter, YouTube, Particular blogs, Cousera etc. . . . ). In some embodiments, the system may track when (e.g., time, date, location, etc. . . . ) a person looks at something and what device they use, and such information may be included in a ranking algorithm for recommending certain content, for example.

Further examples and details about algorithms (aka strategies), a framework for executing multiple strategies to obtain composite results, and the integration of content are provided below.

Strategy Framework

Figure 11:
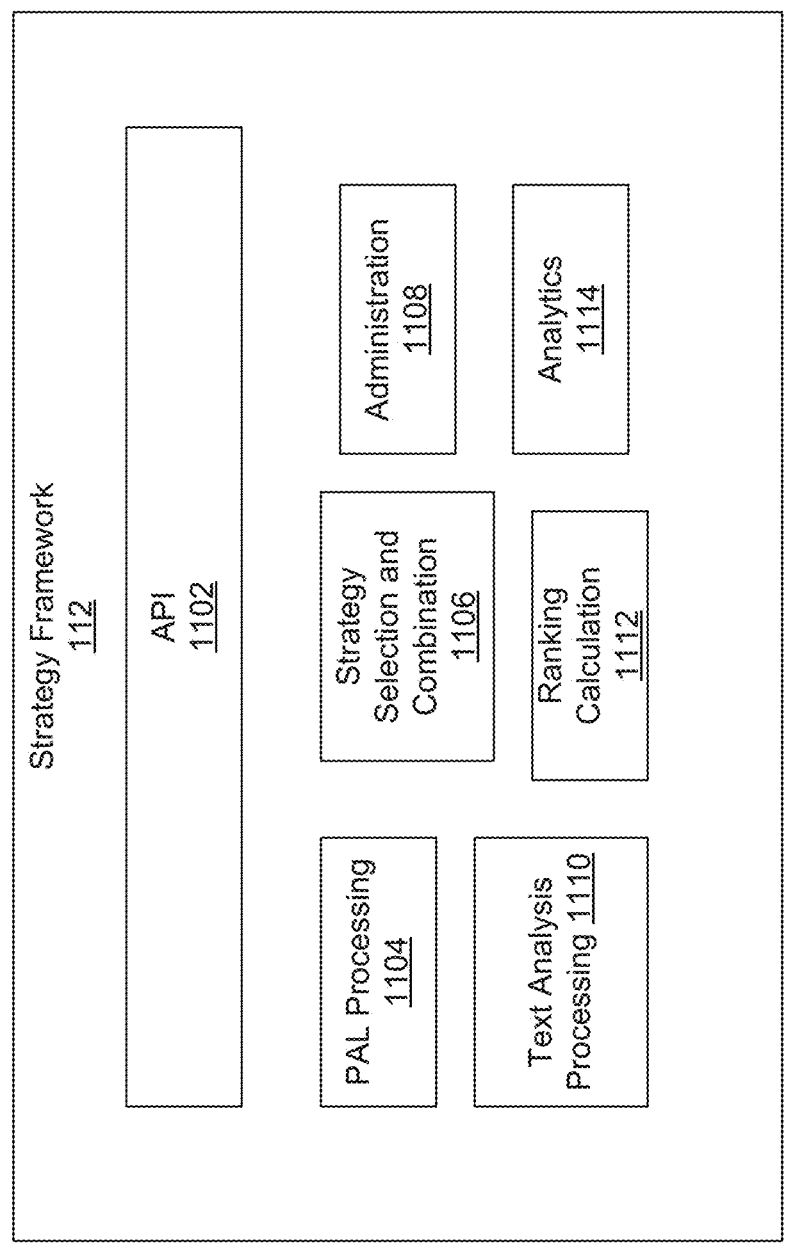
FIG. 11 illustrates an architectural block diagram of a strategy framework according to one embodiment.

FIG. 11 illustrates an architectural block diagram of strategy framework 112 according to one embodiment. Functional components of one example recommendation engine framework strategy framework 112 may include an application program interface (API) 1102, a predictive analysis library (PAL) processing block 1104, a strategy selection and combination processing block ("strategy processing block") 1106, an administration block 1108, a text analysis processing block 1110, a ranking calculation block 1112, and an analytics block 1114. Strategy framework 112 combines, runs, and merges the results of the different strategies. Strategy framework 112 may also be extensible for adding new strategies. Strategy framework 112 also determines which strategies can be executed and which strategies will be executed. Strategy framework 112 may run using a graph database, such as the learning graph 114.

API 1102 may execute computer code to automate the algorithms and processes of strategy framework 112 for processing strategies and generating one or more recommendations and communicating the recommendations to functional blocks of backend system 101. PAL processing block 1104 provides a software interface to access the processor resources for executing software code of strategy framework 112 for predictive analysis of strategies.

Strategy processing block 1106 combines, selects, and merges strategies and, from these processes, generates recommendations of learning content based on the strategies. Strategy processing block 1106 processes the strategies based on information about the user. In some embodiments, strategy processing block 1106 retrieves the user information from the learning graph 114, both from the corresponding person node 207-209 of the user and from nodes that are a predetermined number of associations or a predetermined distance from the person node 207-209. Strategy processing block 1106 may execute variations of a spreading activation algorithm to consider the distance and the "connectedness" of the nodes. One variation may be similar to those used in page rankings. Such variations allow a determination based on whether a node that is two steps away is more important for user content than a directly connected node. In some embodiment, after the ranking is completed, strategy processing block 1106 uses the top-k elements for the queries.

Administration block 1108 handles the administration of strategy framework 112. The administration may include a rule set that defines access of users to learning content. For example, a user may need to be at a certain level of management to receive content related to supervisory training. Text analysis processing block 1110 analyzes text in strategies, learning content and in nodes in the learning graph 114, and provides the analyzed text to strategy processing block 1106 for strategy selection and execution and other processes Rank calculating block 1112 calculates rankings of recommendations for selected and executed strategies determined by strategy processing block 1106. Analytics block 1114 performs data analytics on the learning graph 114 and strategies for traversals of the learning graph 114.

Figure 12:
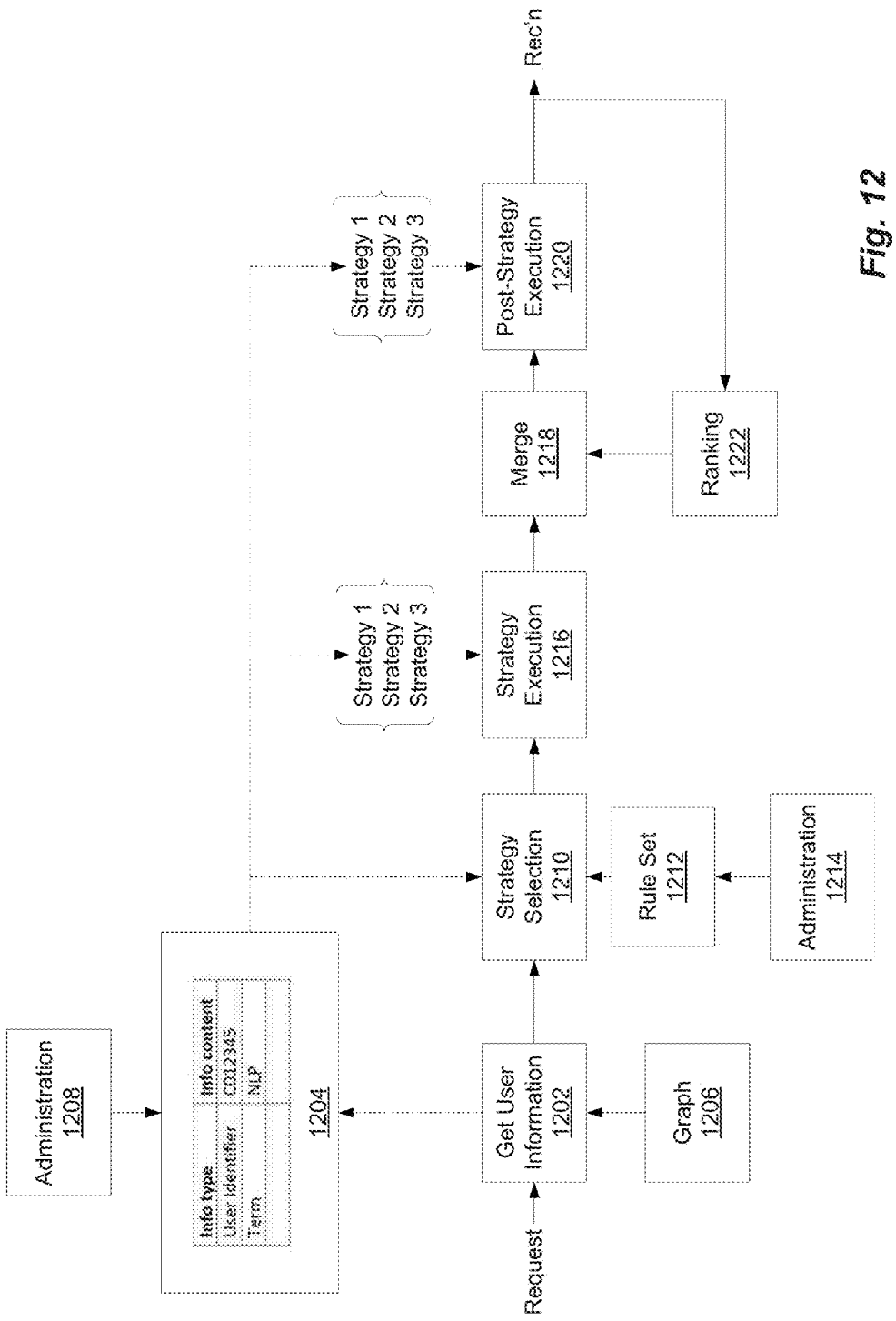
FIG. 12 illustrates a block diagram illustrating process flow of strategy processing according to one embodiment.

FIG. 12 is a block diagram illustrating process flow of strategy processing block 1106 according to one embodiment.

In response to a request from a requesting user, at 1202, strategy processing block 1106 retrieves user information about the requesting user by accessing, at 1206, the learning graph 114. At 1204, strategy processing block 1106 generates an information file of user information that may be organized as a table. In this example, the table contains pairs of 'Information Type' and 'Information Content.'. In this example, a user identifier is saved as: (entityId;'C012345'). At 1208, administration block 1108 (or an external administrator) may alter the information file with the user information in response to commands from the learning department. For example, terms could be added to all users as interests without manipulating the learning graph 114.

If the person node does not include all information needed for the strategies, strategy processing block 1106 searches the learning graph 114 by moving or traversing a predetermined number of nodes from the person node of the user to obtain additional information. This allows information about persons that are not in the network of the user to be used for running the strategies.

Figure 13:
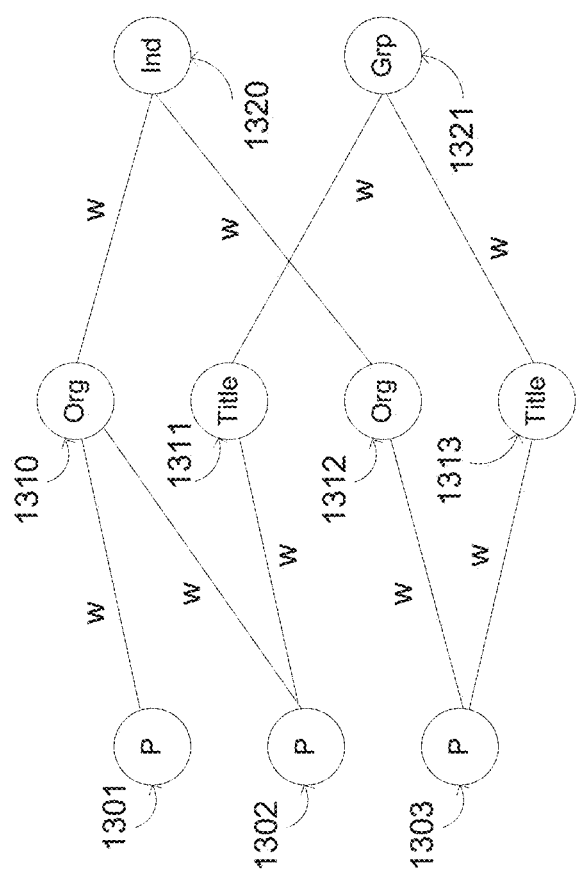
FIG. 13 illustrates one example of extracting information from a learning graph data model according to an embodiment.

FIG. 13 illustrates one example of extracting information from learning graph 114 according to an embodiment. For example, person node 1302 corresponds to the user. Strategy processing block 1106 searches a predetermined number of nodes from person node 1302 or along the shortest path that leads to the desired information. For example, the predetermined number of nodes is two nodes (and no weighting is assigned for a distance limitation). Strategy processing block 1106 searches an organization node 1310 and title node 1311 for additional information about the user. For a total distance of two nodes, strategy processing block 1106 searches person node 1302 for additional information, but does not search a person node 1303. Because of the distance limitation, an organization node 1312 and a title node 1313 are not searched. For a second step from organization node 1310, strategy processing block 1106 searches person node 1301, as noted, and industry node 1320. For a second step from title node 1311, strategy processing block 1106 searches group node 1321. An example technique for traversing the learning graph 114 for finding content or nodes includes spreading activation.

Referring again to FIG. 12, at 1210, strategy processing block 1106 determines the strategies that will be executed. This determination may be determining the strategies that strategy framework 112 is capable of running.

In one embodiment, selection of strategies is done in two combined steps. First, strategy processing block 1106 analyzes all existing strategies to decide, if the framework has all necessary information to run this strategy (For example, it does not make sense to run a strategy that analyzes the Twitter® activity of a user, if the system does not know the Twitter® user). This first step provides a set of strategies that potentially can be used.

Second, at 1212, strategy processing block 1106 determines, as a second step, whether there is a rule set defined in the administration block strategy processing block 1106 of the framework to influence the selection of the strategies. These rules allow the learning department or others to influence the set of recommendations. Rules may be based on two different information types. The first type is based on information about the user himself (e.g., do not execute a particular strategy for all users). The second type uses information about the strategy itself to determine if a strategy shall be executed (e.g., do not run strategies that have an expected runtime longer than 2 seconds or do not run social media strategies). After applying all rules to the strategies, strategy processing block 1106 defines a set of strategies. In some embodiments, strategy processing block 1106 uses the run time of a strategy as a criterion for determining whether to select a strategy. For example, strategy processing block 1106 may exclude a strategy having a long run time if the strategy would be run on a device, such as a mobile device, in which a longer run time would be problematic.

At 1216, strategy processing block 1106 executes each strategy of the set of selected strategies for the user information. Strategy processing block 1106 analyzes the parameters of the strategies and compares the analyzed parameters with the user information table to get every possible combination of parameters for each strategy. Afterwards, strategy processing block 1106 executes all strategies with their specific parameters. In some embodiments, strategy processing block 1106 executes all strategies in parallel.

At 1218, strategy processing block 1106 merges the results of the executed strategies to generate a single list of potential recommendations for the requesting user. In some embodiments, at 1222, rank calculating block 1112 generates a ranking score for every recommendation. At 1218, strategy processing block 1106 adds the ranking to the list.

At 1220, strategy processing block 1106 executes a post-strategy algorithm to optimize the set of recommendations before a final ranking is created. A feature of the post-strategy algorithm is to find recommendations, which are not consumable for the user. For example, content that is found by strategies but is written in a language the user does not speak. Other examples could be obsolete content, which is available in a newer version, content that the user has already consumed but is shown as recommended or content that the user is not allowed to see because of security or privacy reasons. Post strategies may find recommendations that should not be shown to the user. Each strategy may provide a list of recommendations that shall be ignored.

The post-strategy algorithm may also filter the list of recommendations. Every recommendation that is mentioned in the result set of one of the post executed strategies will be deleted from the list if the filter so indicates. After post strategy execution, at 1220, rank calculating block 1112 ranks each recommendation in the list of recommendations.

Saving the information about the strategies in learning graph 114 graph allows rank calculating block 1112 to retrieve more information about the strategies and use this information to create a more personalized ranking in the ranking component.

In order to get more personalized recommendations from rank calculating block 1112, rank calculating block 1112 may save user feedback in the learning graph 114. If a user has chosen a recommendation, the client 120, 121, 122 communicates the selection of a recommendation by a user to the backend server 101 for storing in the person node 207-209 for the user. Rank calculating block 1112 may use this selection information to create more personalized rankings for the user.

Strategies in the Learning Graph

Figure 14:
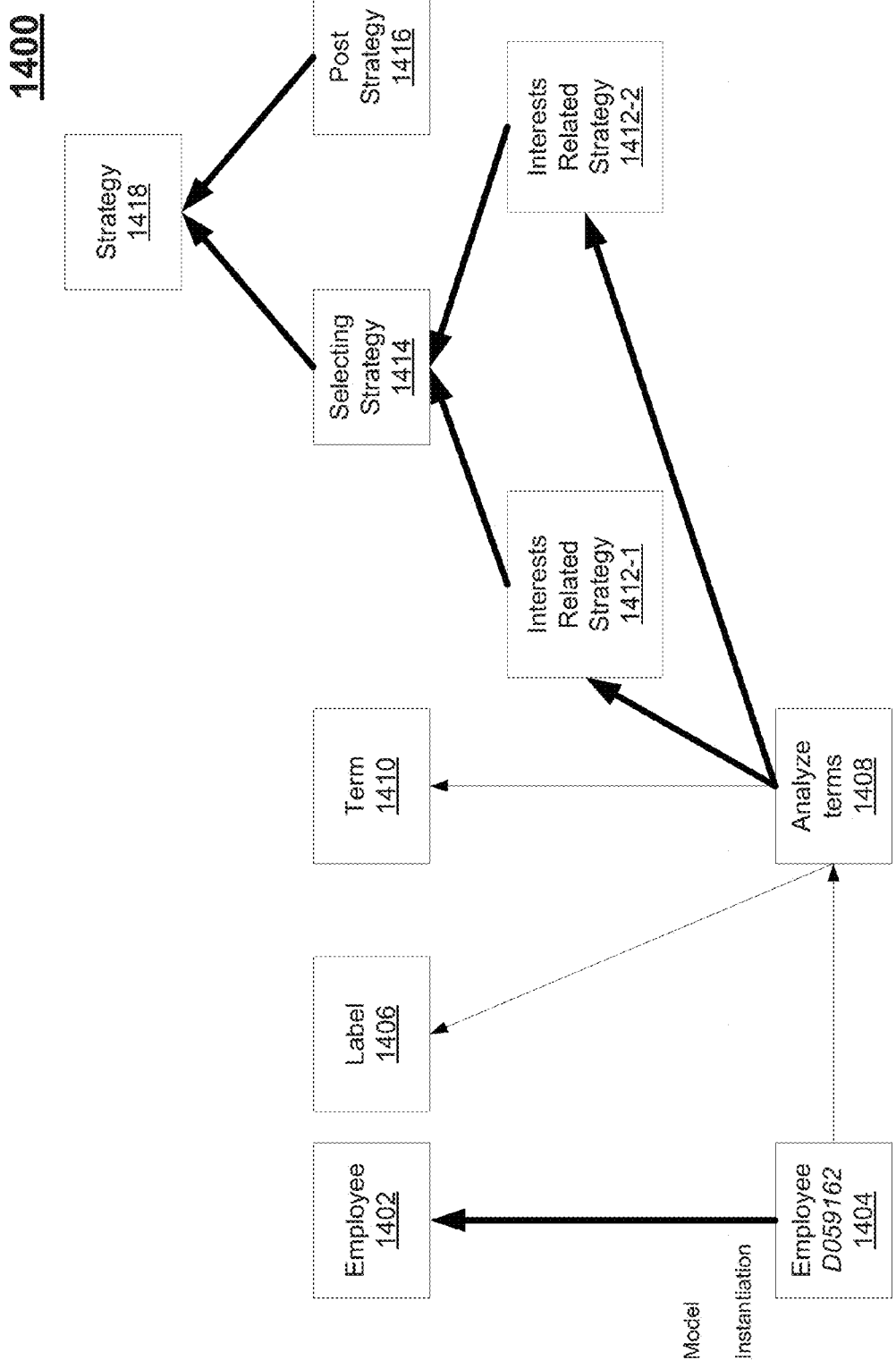
FIG. 14 illustrates data flow of saving strategies to a learning graph according to one embodiment.

FIG. 14 illustrates data flow 1400 of saving strategies to the learning graph 114 according to one embodiment. Bold arrows represent term to superterm relationships. Non-bold arrows represent associations.

Strategy processing block 1106 instantiates personal node 1402 for an employee as employee 1404. Strategy processing block 1106 analyzes terms 1408 as an instantiation of one of the interest related strategies 1412-1 or 1412-2 to build a strategy hierarchy, such as illustrated in FIG. 14.

In some embodiments, all strategies are subterms of a strategy term 1410. From this structure, a hierarchy, such as shown in FIG. 14, may be built. Rules for the strategy selection can be defined that refer to the hierarchy.

In this example, all properties of the nodes are saved in the learning graph 114. For example, a property label of an employee is saved in the learning graph as label node 1406. In this example, the value of each property is saved in its own column for every item, and a node with the column name exists for every property. This arrangement allows the strategy node to be related to the nodes of the properties, which represent their parameters. The association may be used to save the order of the parameters. Further, the type of parameter may be saved. In some embodiments, the backend 101 may provide the parameter type. The parameter type may be for example, an integer or a character string.

Strategy processing block 1106 analyzes terms 1406 to evaluate interest related strategies 1412. The interests are related to the users or in this example, employee 1402. The employee 1402 may set its interests which are stored in the person node for the employee 1402. Strategy processing block 1106 executes strategy selection algorithms 1414. As part of the analyze terms 1408, rules can be applied for selecting strategies. Strategy processing block 1106 executes a post strategy algorithm 1416 of post strategy processing, such as described above, and then stores the analyzed strategies as strategy algorithm 1418. Strategy algorithm 1418 is executed to determine recommendations.

Figure 15:
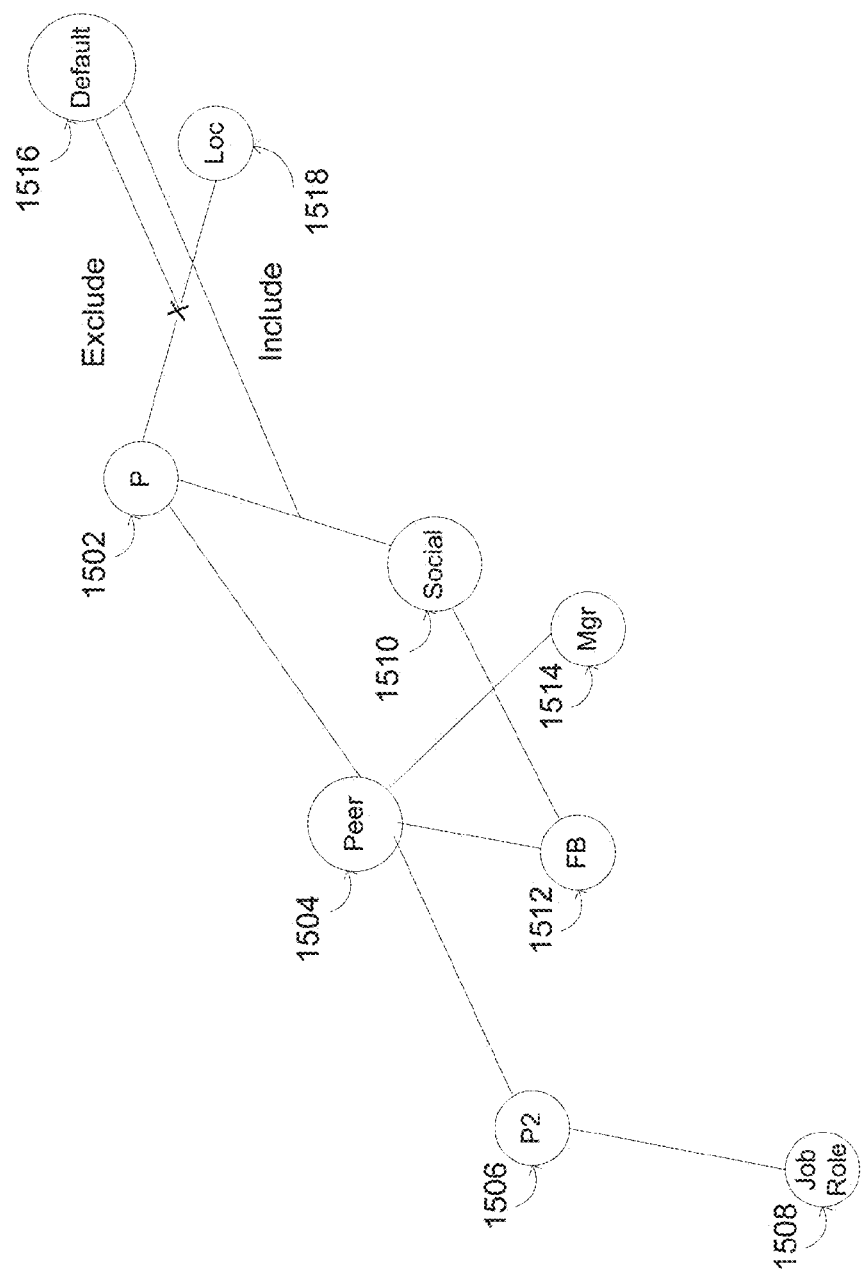
FIG. 15 illustrates data flow of executing strategies according to one embodiment.

FIG. 15 illustrates data flow 1500 between nodes of executing strategies according to one embodiment. The circled items in FIG. 15 represent nodes in the learning graph 114, but for simplicity, will be referred to by the parameter name or the strategy name. A strategy may be executed by defining the parameters that are to be used to determine the appropriate strategies. A request may include a user identifier, which in this example, will correspond to the user associated with person node 1502 (one of person nodes 207-209). The request can include, for example, interests (e.g., machine learning) of the person, the location of the person, and the type of device (e.g., tablet or notebook) on which the content will be viewed. A default strategy 1516 may exclude content based on location 1518 and include content based on social networks 1510, such as Facebook® 1512, and connections of person 1502 on the social network 1510. Person 1502 is associated with peers 1504 that will be run through the strategy. A second person 1506 (one of person nodes 207-209) has a role 1508 that may determine whether the second person 1506 will be used for executing the strategy. Peers 1504 that are managers 1514 may be used for the strategy. If person 1502 is a manager, the interests and content learned by person 1502 may be relevant to learning content relevant for person 1502.

Figure 16:
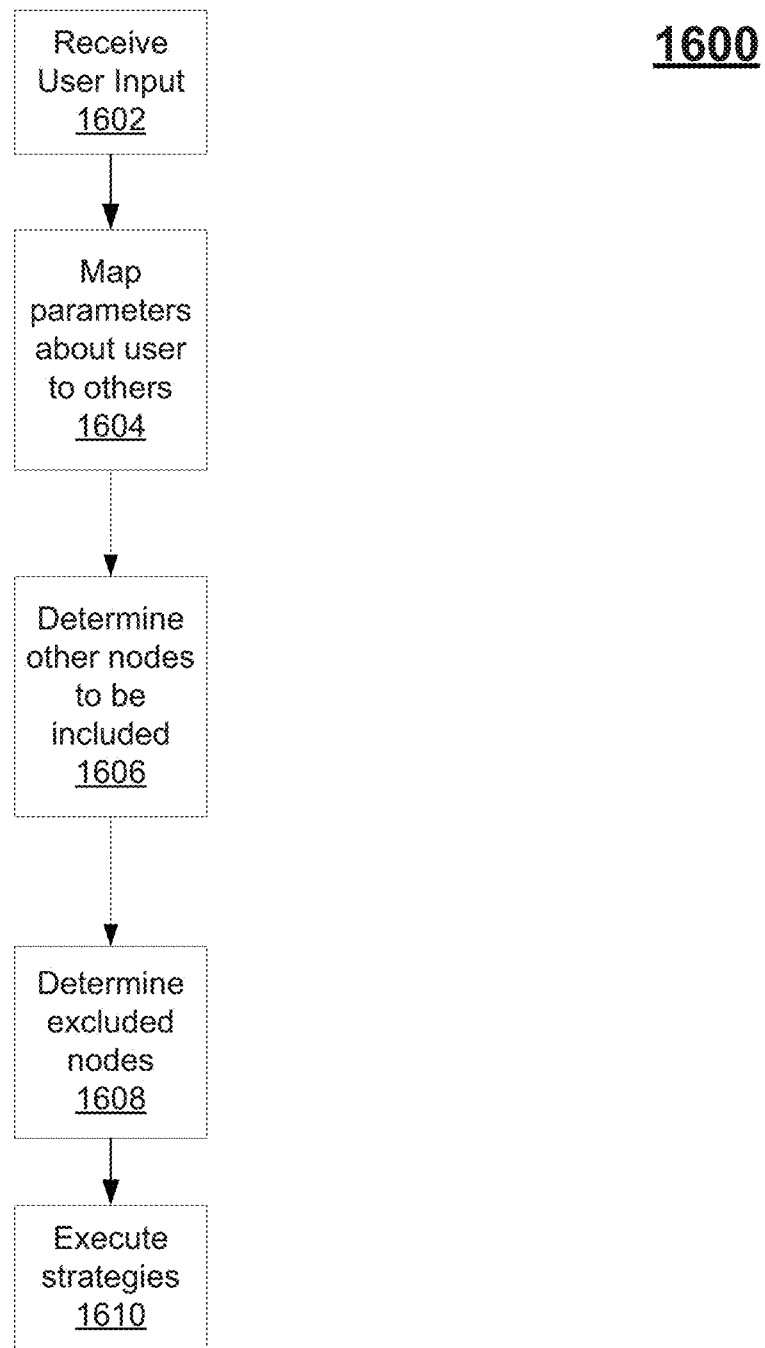
FIG. 16 illustrates a process flow of saving strategies to a learning graph according to one embodiment.

FIG. 16 illustrates a process flow 1600 of saving strategies to a learning graph according to one embodiment. At 1602, strategy processing block 1106 receives user input for the learning content. At 1604, strategy processing block 1106 retrieves a plurality of strategy algorithms from the learning graph 114 in response to the user request.

At 1606, strategy processing block 1106 maps parameters about the user associated with person node 1502 to other person nodes (e.g., person node 1506) to determine associations between the user and other nodes in response to the user request.

At 1608, strategy processing block 1106 determines whether the other nodes are to be included in the execution of strategies based on parameters of the strategy and the person nodes 1502 and 1506.

At 1610, strategy processing block 1106 excludes other nodes from execution of the strategy based on the determination. For example node 1518 is excluded based on the location. At 1612, strategy processing block 1106 executes strategies on the person node and the included other nodes.

A strategy may include searching for learning items based on a free key term that is included in the user request. The search may be of the title of the document, key words associated with the document or the text of the document. For example, search (e.g., using the FUZZY-Search) for a stated interest in the title of documents. In addition, searching for key words like 'Best Practice', 'Training', 'Course', etc. in the description to classify a document as a learning item or course.

A strategy may include searching for learning items based on terms related to the free key term, terms related to the free key term, or at least one predetermined rule set, or any combination thereof.

A strategy may include searching content nodes 212-215 based on a specified term identifier. Strategy processing block 1106 finds documents connected to a specified term identifier. In addition, searching for key words like 'Best Practice', 'Training', 'Course', etc. in the description may classify a document as a learning item or course. The ranking may be based on the weight of the association of the document to the term.

A strategy may include searching content nodes 212-215 for learning content based on an interest or interests of the user that may be included in the user request or in the person node. In one embodiment, strategy processing block 1106 traverses the learning graph 114 based on the stated interest.

Strategy processing block 1106 may recommend content related to the stated interest of the learner that is also authored by people who are member of the same groups or projects as the learner. For example, strategy processing block 1106 takes the employee-identifier, finds the stated interests (from the address-book and Jive™) and then finds colleagues with the most similar interests and recommends documents authored by them and ranked by the number of views plus a number of comments. As another example, strategy processing block 1106 may recommend documents with content learned by them and ranked by the number of views plus a number of comments.

A strategy may map parameters about the user to person nodes to determine associations between the user and other nodes by mapping associations between person nodes of persons in a group. A strategy may include finding content nodes 212-215 based on interests of the user being similar to interests of persons in the group. For example, strategy processing block 1106 takes the employee-ID (D or I-Number), finds the stated interests (from the address-book and Jive) and then finds documents which have most of these interests related to (from a text analysis) a number of views plus a number of comments.

A strategy may include searching content nodes having a relationship with an interest indication in the user request.

Strategy processing block 1106 may map parameters about the user to person nodes to determine associations between the user and other nodes in response to the user request by mapping associations between person nodes of persons in a group of the user. A strategy may include finding content nodes based on persons in the group. For example, strategy processing block 1106 may recommend content related to the stated interest of the learner that is also authored by people who are members of the same groups or projects as the learner.

PAL processing block 1104 may use preprocessing with predictive analytics to find related terms. The analysis may be a priori to determine related items. The a priori algorithm may be a shopping cart like-analysis that recommends additional product which were bought in combination with items in the shopping cart, such as "Buyers who bought product A also bought product B". PAL processing block 1104 uses this method for treating a document like a shopping cart (or transaction) and treat the related terms (which may be retrieved out of the text analysis) as line items or products in the shopping cart, in a similar way as using the relation of an employee to her stated interests.

PAL processing block 1104 may use link prediction preprocessing to predict or recommend links in a social network (such as Facebook® or LinkedIn®) or company collaboration tools (such as Jam). PAL processing block 1104 uses this preprocessing to find recommendation between terms or learning courses.

A strategy may include finding learning content that includes the stated term in the request or related terms to the stated term or both. For example, strategy processing block 1106 find learning items which includes the stated interest as well as related terms (based on a priori analysis of content to terms) and ranks them on appearance of the terms. As noted above, the learning graph 114 may include person nodes that are associated based on associations in an external social network between individuals associated with the person nodes. A strategy may include finding content nodes based on the associated person nodes. For example, strategy processing block 1106 may detect the community of the similar learners and recommend most frequently consumed content or most frequently requested content to the users of the community. In some embodiments, the communities are written back to the learning graph 114 to distinguish between the hierarchies of the community of learners and improve the graph traversal. The similar learners may be based on predetermined interests or the social community of the learners. The similar learners may be based on user specified tastes or interests. In some embodiments, recommendations are written to the learning graph 114 to track what has already been recommended to an individual.

A strategy may include determining learning content based on previous learning of the user or other persons.

In one embodiment, the process flow 1600 may include determining person nodes similar to the person node of the user to determine a community of individuals based on similar interests; determining numbers of times of access to learning content of individuals in the community; and determining most accessed learning content of the community.

In one embodiment, the process flow 1600 may include determining person nodes similar to the person node of the user to determine a community of individuals based on topics of access learning content; determining numbers of times of access to learning content of individuals in the community; and determining most accessed learning content of the community. In one embodiment, the process flow 1600 may include determining person nodes similar to the person node of the user to determine a community of individuals based on similar learning preferences or similar prior learnings; determining numbers of times of access to learning content of individuals in the community; and determining most accessed learning content of the community. The commonalities may include, for example, learning preferences of the user or the community or what the user or community has learned earlier.

Content Integration—Organizational Glossary

Another aspect of the present disclosure includes the creation of an organizational glossary (or dictionary). Many organizations have terms and topics that are of particular interest to the organization. An organizational glossary (or organizational dictionary) may include a large list of terms that are commonly used inside a particular organization (e.g., in documents such as emails, memos, technical documents, etc. . . . ) and that may have particular meaning and relationships to other terms or content inside the organization that may (or may not) be different than a generic meaning and/or relationships of the same term to other organizations. For example, the word "who" may have a generic meaning to most organizations, but for a hospital the letters "WHO" may be an important reference to the "World Health Organization." As another example, the word "traction" may have one meaning to a software company (e.g., getting "traction" with a customer), whereas in the context of a manufacturer of agricultural equipment, the term "traction" may have a technical meaning pertaining to tractors or other machinery. The above examples illustrate that organizational glossaries may be very different for different organizations based on the activities of the organization, for example.

Embodiments of the present disclosure include techniques for automatically generating an organizational glossary from a plurality of text documents, for example. According to some aspects, the present disclosure includes an innovative architecture for processing text documents and generating lists of terms that may include either single words ("Unigrams"), or lexical cohesive units as pairs of words ("Bigrams"), triplets of words ("Trigrams"), or even different numbers of consequent words ("N-grams") which represent a unique lexical concept. Processing may combine such terms into an organizational glossary, for example. According to another aspect, the present disclosure includes processing text documents to generate an organizational glossary and integrating the organizational glossary into a learning graph (e.g., such as the learning graph described above).

Figure 17:
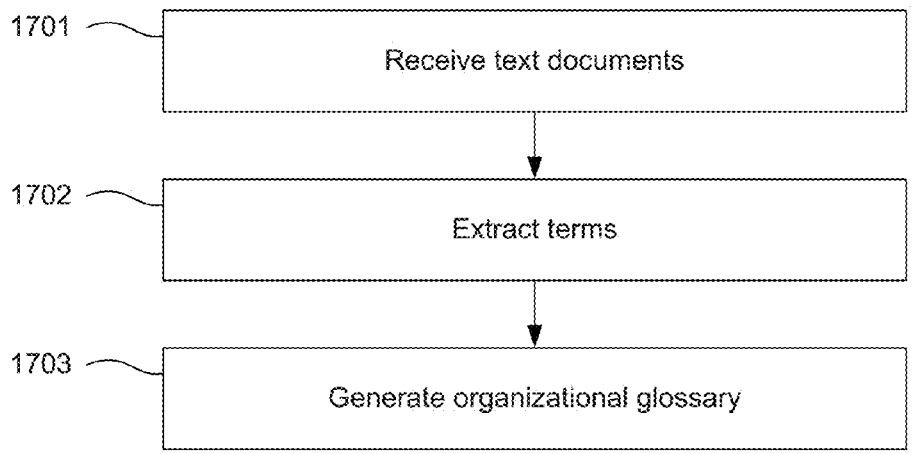
FIG. 17 illustrates a process for generating an organizational glossary according to one embodiment.

FIG. 17 illustrates a process for generating an organizational glossary according to one embodiment. In one embodiment, generating an organizational glossary may include receiving, on a computer system, a plurality of text documents at 1701. The text documents may include a wide variety of unstructured or semi-structured documents. Unstructured text documents may include the body of an email or word processing documents where the information in the documents varies with little or no structural patterns. Semi-structured documents may include documents with text arranged repetitive structure or positions, such as text forms, structured header portions of an email (e.g., To:, From:, Subject), job profiles, job descriptions, job postings, or other forms of text records with various sections, for example. In certain embodiments, a corpus of organizational documents may be processed where the documents have a variety of different documents types, for example (e.g., a word processor document such as .docx, a PDF such as .pdf, a presentation document such as .pptx, or an email message such as .msg, etc. . . . ).

Features and advantages of the present disclosure include receiving text documents for a particular organizational entity (e.g., across a common network or domain for a single organizational entity). Accordingly, the text documents correspond to a particular organizational entity. Because the text documents are from a particular organizational entity (e.g., a single organizational entity such as a single company or even a single division or department within a company), and because the documents may be unstructured or semi-structured with a variety of different document types, embodiments of the present disclosure include an innovative text analysis approach for generating a customized organization specific glossary. At 1702, terms are extracted from the text documents. The terms may be extracted according to an algorithm configured to identify terms relevant to the particular organizational entity. Example techniques that may be used in such an algorithm for generating an organizational glossary for a particular organization are presented below to illustrate advantages of the present disclosure. At 1703, an organizational glossary is generated. The organizational glossary may be specific to the particular organizational entity, and may comprise a list of terms relevant to the particular organizational entity, for example.

Figure 18:
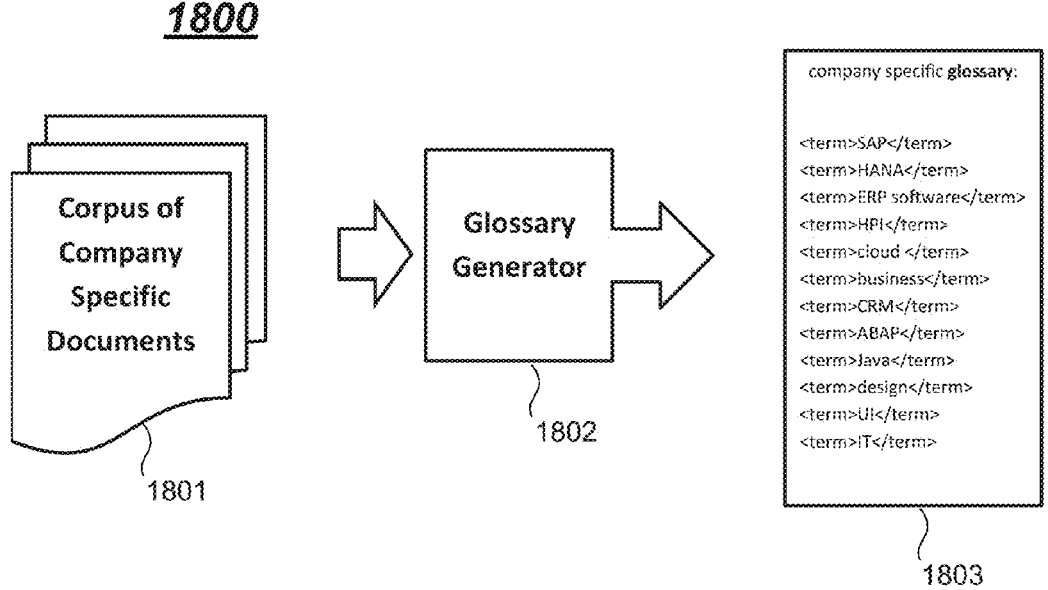
FIG. 18 illustrates an automatic organizational glossary generator (AGG) according to an embodiment.

FIG. 18 illustrates an automatic organizational glossary generator (AGG) according to an embodiment. AGG 1800 may create a glossary of terms that are specific to a certain company out of a corpus of text documents that are specific to that company. AGG 1800 may receive a corpus of company specific documents 1801. A glossary generator 1802 processes the documents to extract terms. Glossary generator 1802 may include text preprocessing techniques such a stemming, lemmatization, and the removal of stop words and one or more text analysis techniques to determine term frequency (TF) and in some cases inverse document frequency (IDF) or related techniques to produce a company specific glossary 1803 including a list of terms relevant to the specific company, for example. As described in more detail below, in some particular embodiments, the list of company specific (or company relevant) terms in the glossary may be integrated into a learning graph and incorporated into a learning system as described above. However, an organizational glossary may have other advantageous uses such as in document management systems or a wide variety of company software applications, for example.

Figure 19:
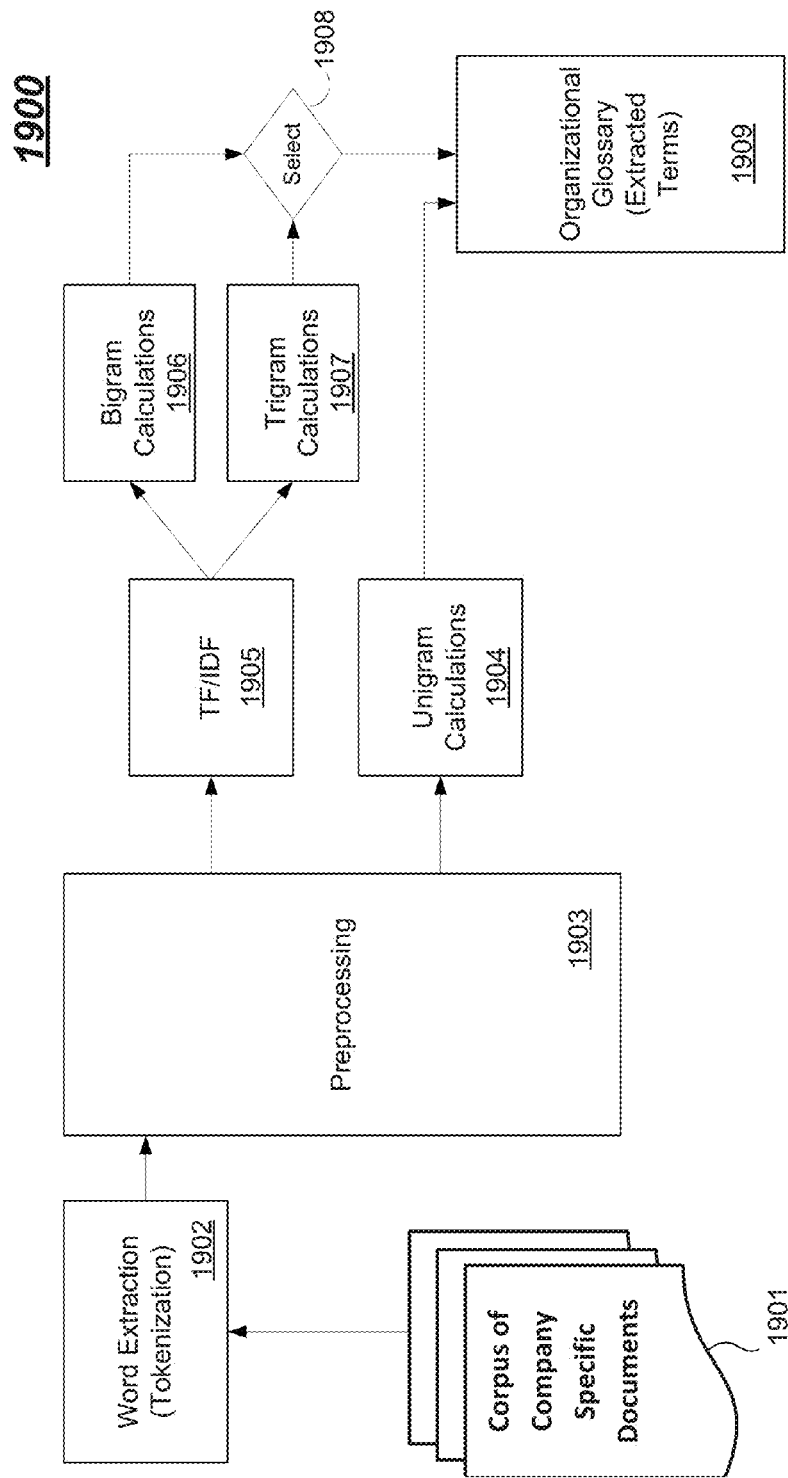
FIG. 19 illustrates an architecture for generating a learning graph according to an embodiment.

FIG. 19 illustrates an architecture for generating a learning graph according to an embodiment. Features and advantages of the present disclosure include receiving a corporate or other organizational corpus of documents to determine terms specific for that organization. A glossary may be used to develop a taxonomy of company terms (e.g., a corporate taxonomy), for example, which may be relevant for automated learning in some applications. In this example, a corpus of company specific documents 1901 is received by a word extraction (tokenization) software component 1902. Word extraction component 1902 may receive a body of content that exists in a company as an input and tokenize the documents and output the words in the documents, for example. Word extraction component 1902 may further output linguistic information, such as "position", "type" (e.g., noun, verb, adjective, etc. . . . ).

The output of words and other information is provided to preprocessing software component 1903. Example preprocessing tasks may include word stemming (e.g., test, tests), lemmatizing, eliminating one or more of punctuations, numbers, verbs, or compounds comprising prepositions and determiners, making all letters lower case, and other syntactic analysis, for example. Lemmatizing is a computational linguistics algorithmic process of determining the lemma for a given word. Lemmatization may include grouping together the different inflected forms of a word so they can be analyzed as a single item.

Preprocessing may include removing "stop words." In the present computing architecture, stop words are words which are filtered out before the processing of natural language data (text) into the glossary, for example. Features and advantages of the present disclosure include eliminating a customized stop word list for the organization. For example, many organizations may have specific acronyms that have meaning only within the organization (or nuanced meaning or more relevance that in other organizations). In one embodiment, a predefined list of acronyms for the particular organization entity is stored on a computer system, and the predefined acronyms are removed, electronically by a computer system, from the stop words so that the stop words are electronically customized for the particular organizational entity. For example, the stop word "who" may be removed from a hospital stop word list because "WHO" (World Health Organization) may be important to the hospital.

After the preprocessing stage, term frequency and inverse document frequency (TF/IDF) calculations and unigram calculations may be performed in parallel, for example. In this example, the present system may generate terms comprising a single word (Unigram), two words (Bigrams), or three words (Trigrams). A unigram calculations software component 1904 may receive words for particular documents from preprocessor 1903. In some applications, it has been discovered that calculation of term frequencies over the whole corpus may not yield good results because of the diverse nature of documents in the corpus rendering different corporate documents irrelevant to each other, for example. Accordingly, a normalized term frequency may be used for calculating unigrams. For example, in one embodiment, unigram calculator generates unigrams corresponding to particular text documents based on a normalized term frequency in each particular text document. Term frequencies (TF) may be calculated per document and normalized over a number of terms in each document, for example. In some embodiments, unigram calculator 1904 may further generate a unigrams by filtering generic words and specific words from each particular document. Generic words may include words such as "the" or "and" that have a very high normalized term frequency ("TF_NORM"), for example. Specific words may be words that only occur in a document a few times and are not particularly indicative of what the document is about. Specific words typically have a very low TF_NORM, for example, and are similarly not particularly indicative about the documents subject matter. Accordingly, generic words are filtered out when a normalized term frequency for a particular word is greater than a first threshold and specific words are filtered out when the normalized term frequency for a particular word is less than a second threshold, and wherein the first threshold is greater than the second threshold. An example optimization filter that may be applied during unigram generation may be "TF_NORM"<=90 AND "TF_NORM">=10, where generic words that have a TF_NORM greater than a first threshold (e.g., 90) are eliminated and specific words that have a TF_NORM less than a second threshold (e.g., 10) are also eliminated.

Referring again to FIG. 19, n-gram generation may be based on a normalized term frequency-inverse document frequency calculated across the plurality of text documents. For example, n-gram generation may start by calculating the term frequency over the inverse document frequency (TF/IDF), which may be used in n-gram calculations. In this example, TF/IDF is calculated over the corpus of documents by TF/IDF software component 1905. Term frequency (TF) is normalized over the corpus (e.g., repeated words may be averaged). An example IDF calculation may be as follows:

$$idf(t, D) = \log \frac{N}{|\{d, \in D : t \in d\}|}.$$

The result may be obtained by TF*IDF, for example, where a normalized term frequency-inverse document frequency may be:

NORM_TF_IDF=[TF−Min(TF)/Max(TF)−Min(TF)]
*100.

The result may be used for n-gram calculations, such as bigram and trigram calculations. Additionally, in one embodiment, normalized TF/IDF may be optimized for the values which occur between 10%-80% over the corpus. The optimization is to filter the keywords extraction results by removing the most generic and the most specific words which are not identifying of the documents. For example, one filter that may be used is as follows:

"TF_IDF_NORM"<=80 AND "TF_IDF_NORM">=10.

Similar to the filter for unigrams, words are filtered out when a normalized TF/IDF for a particular word is greater than a first threshold (e.g., 80) and words are filtered out when the normalized TF/IDF for a particular word is less than a second threshold.

In the example shown in FIG. 19, bigrams and trigrams are calculated by a bigram calculation software component 1906 and a trigram calculation software component 1907. Bigrams and trigrams may be calculated based on the frequency of all two or three consecutive words, for example. The result returns an extended list of all adjacent words, which in some cases may not convey are relevant concept. To improve the quality we calculate an expected value, and we accept the bigrams/trigrams which have occurred more than a predefined number of times (e.g., 5) in the documents, for example.

For instance, bigram calculation component 1906 may calculate a frequency of a plurality of consecutive two words from the plurality of text documents, for example. Next, an expected value may be calculated as follows:

PMI: (LOG(10,(("n11"*"n++")/("n1+"*"n+1"))))

PMI is Pointwise mutual information (PMI), or point mutual information, which is a measure of association used in information theory and statistics. For instance, the PMI of a pair of outcomes x and y belonging to discrete random variables X and Y quantifies the discrepancy between the probability of their coincidence given their joint distribution and their individual distributions, assuming independence. "n11" is the number of times two words appeared together, n++ represents the total number of bigrams in the corpus, n1+ is the number of times the first word occurred in any bigram, and n+1 is the number of times the second word occurred in any bigram. Bigrams may be selected which have a much higher value than the expected value. For instance bigrams from the plurality of text documents may be selected that have a frequency greater than the expected value multiplied by a predefined factor such that a particular bigram is selected when an occurrence of the particular bigram is significantly greater than an occurrence of a first word of the particular bigram alone. In other words, you want to find the words that co-occur together much more than you would expect them to by chance. An example optimization filter is "WHERE "n11">"PMI"*5.

Similarly, trigram calculation component 1907 may calculate a frequency of a plurality of consecutive three words from the plurality of text documents, for example. Next, an expected value may be calculated to find the trigrams which their co-occurrences together are much more than we would expect them by chance. An example expected value may be calculated as follows:

(LOG(10,CAST((("n111"*"n+++")/("n1++"*"N+1+"*"n++1")) AS BIGINT))) AS "PMI"

where "n111" is the number of times three words appeared together, n+++ represents the total number of trigrams in the corpus, n1++ is the number of times the first word occurred in any trigram, n+1+ is the number of times the second word occurred in any trigram, n++1 is the number of times the third word occurred in any trigram. Trigrams may be selected which have a much higher value than the expected value. For instance trigrams from the plurality of text documents may be selected that have a frequency greater than the expected value multiplied by a predefined factor such that a particular trigram is selected when an occurrence of the particular trigram is significantly greater than an occurrence a first word and a second word of the particular trigram without a third word of the particular trigram. An example optimization filter is "WHERE "n111">"PMI"*5.

In one embodiment, a selection software component 1908 selects between the bigrams and trigrams. In other words, embodiments may include a step to select between the right sequence of words when they appear both in bigrams and trigrams. For instance, the text documents may include the phrases "word management" and "word management system." The system may compare the number of occurrences of the first and second word in the trigram with the number of occurrences of them in the bigram. If the first and second words with the same trigram set occurred 5 times or more in the bigram set, then that should be considered as a trigram, otherwise it's a bigram. To optimize the result, n-grams that contain repetitive words may be removed. An example filter for performing the above function is as follows:

WHERE "n111">"n12"*1.1. AND "n111"*1.1
AND "w1"!="w2"
AND "w1"!="w3"
AND "w2"!="w3"
ORDER BY "PMI" ASC where "n111" is the number of occurrences of the three words in trigrams, n12 is the number of co-occurrences of the first and the second words in bigrams and n23 is the number of co-occurrences of the second and the third (n23) words in bigrams. W1, w2, and w3 are the first, second, and third words in the trigram, respectively. The selection algorithm compares a number of co-occurrences of a particular three words in a plurality of trigrams (n111) with the number of co-occurrences of the first and the second words (n12) of the particular three words in a plurality of bigrams, and compares a number of co-occurrences of the particular three words in the plurality of trigrams (n111) with a number of co-occurrences of the second and the third (n23) words of the particular three words in a plurality of bigrams. In other words, if we confirm a cohesive unit of words as trigrams we want to make sure that it was not a bigram that appeared as a trigram by chance. The algorithm also checks for the repetitive words and remove those from the list of trigrams/bigrams.

Finally, the terms from the unigram calculator 1904 and the bigrams and trigrams from the selection component 1908 are merged into the Organizational Glossary 1909 terms extracted from the corpus of documents. By using the machine learning techniques, this glossary can be used as expected output data to use supervised learning that will calibrate the optimization parameters in the algorithms in order to extract better terms in the future. As a particular example, it has been observed that particularly good results are achieved by using job profiles, job postings (or both) as the input for the AGG, as they contain many company specific terms.

Figure 20:
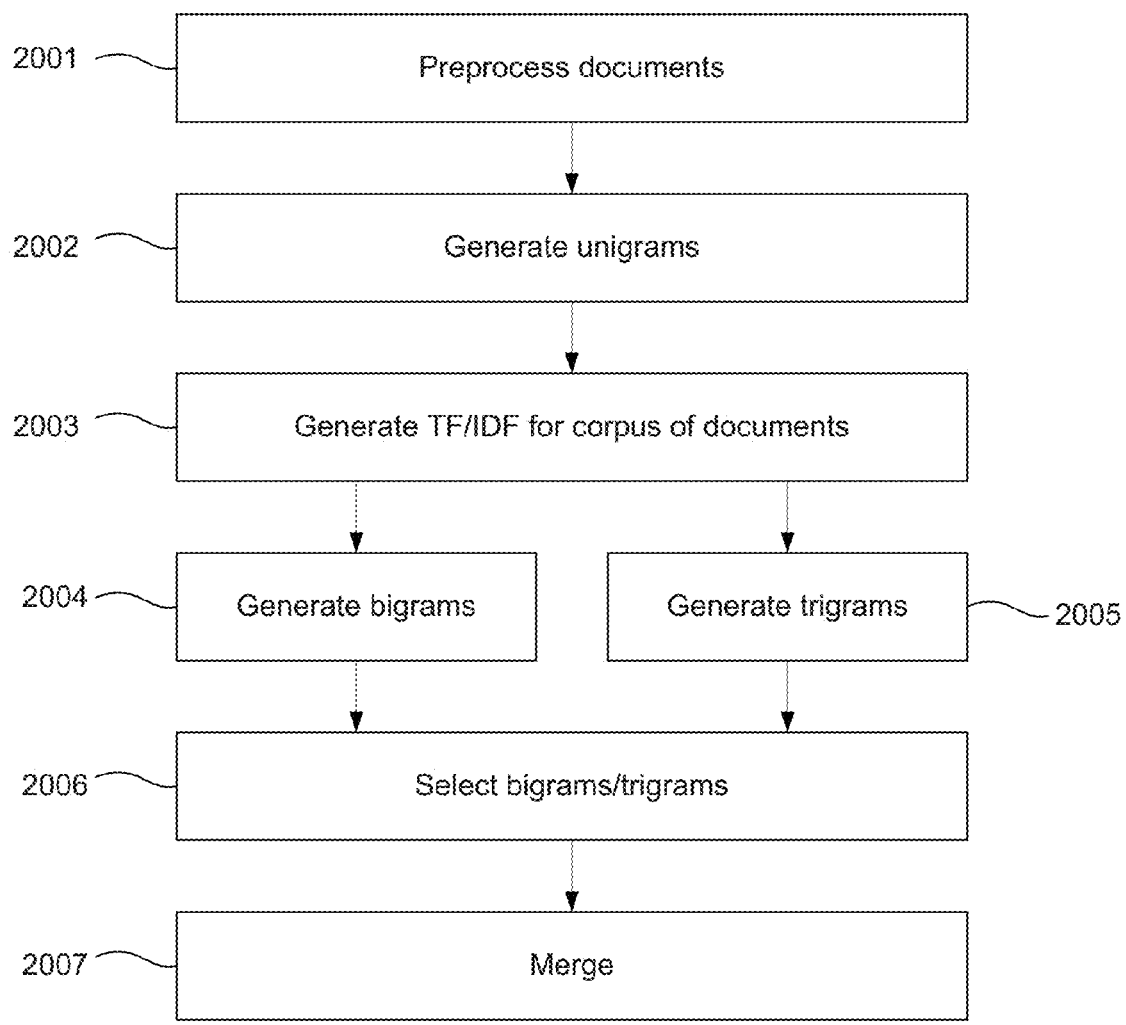
FIG. 20 illustrates a method of generating an organizational glossary according to an embodiment.

FIG. 20 illustrates a method of generating an organizational glossary according to an embodiment. At 2001, a plurality of text documents are preprocessed into a plurality of words, which may include stemming a first plurality of the words, lemmatizing a second plurality of the words, and eliminating customized stop words, one or more of punctuations, numbers, verbs, and compounds comprising prepositions and determiners, for example. At 2002, a plurality of unigrams corresponding to particular text documents are generated based on a normalized term frequency in each particular text document. At 2003, TF/IDF may be generated across the corpus of documents. At 2004, a plurality of bigrams for the plurality of text documents are generated based on a normalized term frequency-inverse document frequency calculated across the plurality of text documents. Similarly, at 2005, a plurality of bigrams for the plurality of text documents are generated based on a normalized term frequency-inverse document frequency calculated across the plurality of text documents. At 2006, bigrams and trigrams are selected from the results of steps 2004 and 2005. At 2007 the plurality of unigrams, the plurality of bigrams, and the plurality of trigrams are merged to form the organizational glossary specific to the particular organizational entity.

Figure 21:
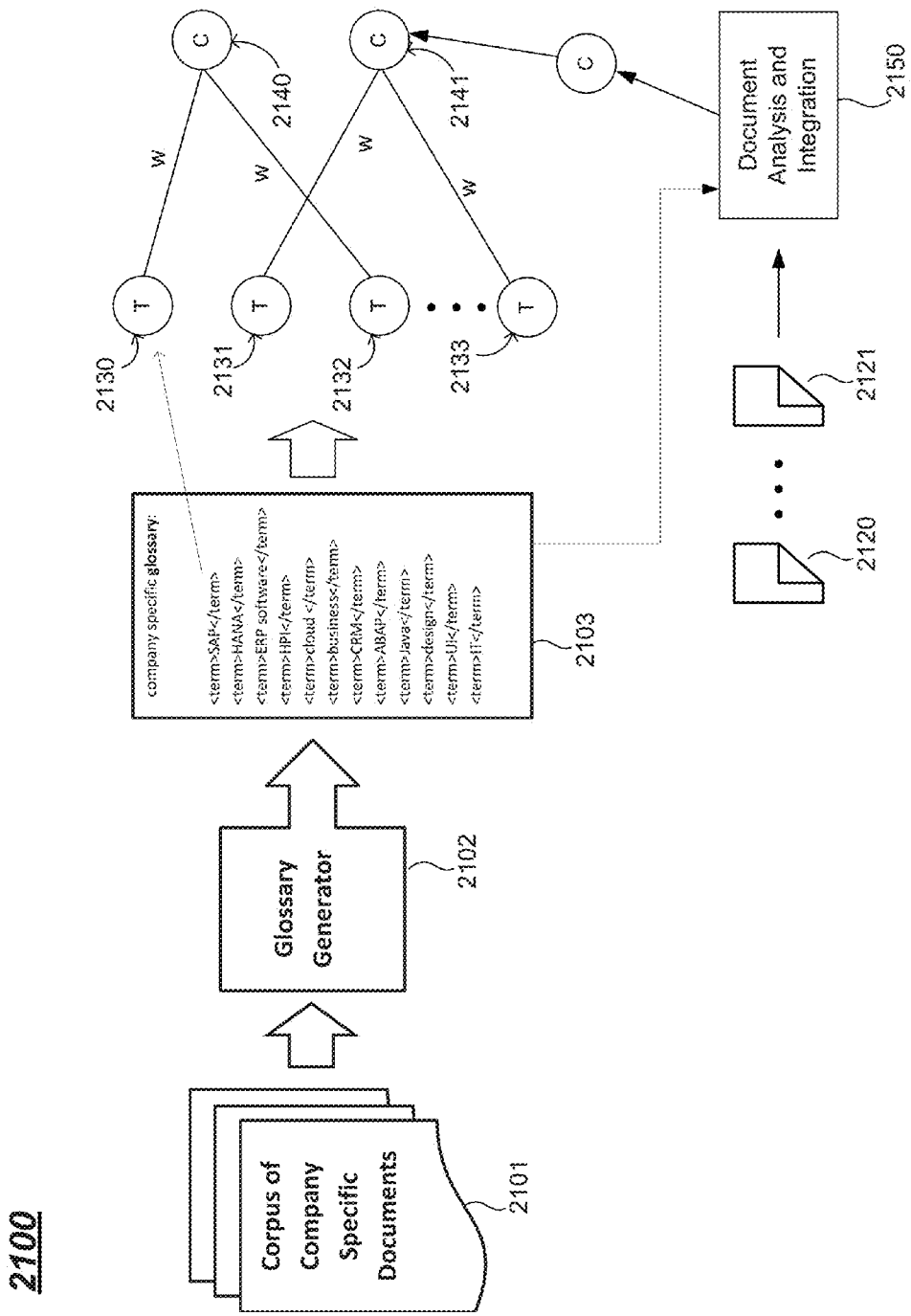
FIG. 21 illustrates an example method of integrating terms from an organizational glossary into a learning graph according to an embodiment.

FIG. 21 illustrates an example method of integrating terms from an organizational glossary into a learning graph according to an embodiment. In this example, a corpus of company specific documents 2101 received in a glossary generator 2102 to produce a customized organization specific glossary 2103. In this example, a plurality of term nodes are created in a learning graph. A particular term node corresponds to a particular term from the plurality of terms in the organizational glossary. Accordingly, the term SAP may have a corresponding term node "T" 2130 created in a learning graph. The terms "HANA," ERP software," . . . , and "IT," may similarly be integrated into the learning graph as individual term nodes 2131 . . . 2133, for example. Term nodes may be linked with person nodes, content nodes, and other nodes in the learning graph using edges as illustrated above, for example. As mentioned above, term nodes, like other nodes, may be implemented as instantiated objects of object classes or subclasses in C++, Java, or other object oriented programming languages, for example.

In one embodiment, as new documents enter the learning system, content nodes for each document are created in the learning graph and linked to term nodes. For example, a document analysis and integration software component (or components) 2150 may receive new documents 2120 and 2121 and the organizational glossary 2103 and generate content nodes for each document and connect each content node to one or more topic nodes using edges based on an analysis of the document. For instance, document analysis may perform text analysis on received documents for a variety of factors including, but not limited to, normalized word frequency, locations of words, proximity of words, the presence of particular words in the title, and a documents source, for example. Based on these and, in some embodiments, other factors, analysis and integration component 2150 may determine that a particular document is related to one or more particular terms in the glossary. Accordingly, component 2150 may create an edge between the particular document and each particular term node when the text analysis indicates that a particular document corresponding to a particular content node is relevant to a particular term node. Further, component 2150 may associate a weight with each edge based on one or more (or even all) of the factors mentioned above, for example. Weights may indicate a relatedness between the document and the term, for example (e.g., how relevant to the term "Machine Learning" is a newly received twitter document or blog feed). As illustrated in FIG. 21, new documents may result in new content nodes 2140 and 2141 with edges to topic nodes. In this example, a weighted edge is created between content node 2140 corresponding to new document 2120 and term nodes 2130 and 2132. Likewise, a weighted edge is created between content node 2141 corresponding to new document 2121 and term nodes 2131 and 2133.

Example Hardware

FIG. 22 illustrates hardware of a special purpose computing machine configured with a process according to the above disclosure. The following hardware description is merely one example. It is to be understood that a variety of computers topologies may be used to implement the above described techniques. An example computer system 2210 is illustrated in FIG. 22. Computer system 2210 includes a bus 2205 or other communication mechanism for communicating information, and one or more processor(s) 2201 coupled with bus 2205 for processing information. Computer system 2210 also includes a memory 2202 coupled to bus 2205 for storing information and instructions to be executed by processor 2201, including information and instructions for performing some of the techniques described above, for example. This memory may also be used for storing programs executed by processor(s) 2201. Possible implementations of this memory may be, but are not limited to, random access memory (RAM), read only memory (ROM), or both. A storage device 2203 is also provided for storing information and instructions. Common forms of storage devices include, for example, a hard drive, a magnetic disk, an optical disk, a CD-ROM, a DVD, a flash or other non-volatile memory, a USB memory card, or any other medium from which a computer can read. Storage device 2203 may include source code, binary code, or software files for performing the techniques above, for example. Storage device and memory are both examples of non-transitory computer readable storage mediums.

Computer system 2210 may be coupled via bus 2205 to a display 2212 for displaying information to a computer user. An input device 2211 such as a keyboard, touchscreen, and/or mouse is coupled to bus 2205 for communicating information and command selections from the user to processor 2201. The combination of these components allows the user to communicate with the system. In some systems, bus 2205 represents multiple specialized buses, for example.

Computer system 2210 also includes a network interface 2204 coupled with bus 2205. Network interface 2204 may provide two-way data communication between computer system 2210 and a network 2220. The network interface 2204 may be a wireless or wired connection, for example. Computer system 2210 can send and receive information through the network interface 2204 across a local area network, an Intranet, a cellular network, or the Internet, for example. One example implementation may include a browser or application ("App") executing on a computing system 2210 that communicates with a learning system on remote server applications as described above. In the Internet example, a browser, for example, may access data and features on backend systems that may reside on multiple different hardware servers 2231-2235 across the network. Servers 2231-2235 and server applications may also reside in a cloud computing environment, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method comprising:
receiving, on a computer system, a plurality of text documents, the text documents corresponding to an organizational entity;

extracting, on the computer system, a plurality terms from the plurality of text documents according to an algorithm configured to identify terms relevant to the organizational entity; and generating, on the computer system, an organizational glossary specific to the organizational entity, the organizational glossary comprising the plurality of terms relevant to the organizational entity, wherein the algorithm includes preprocessing the plurality of text documents into a plurality of words and generating a plurality of n-grams for the plurality of text documents based on a normalized term frequency-inverse document frequency calculated across the plurality of text documents.

2. The method of claim 1 further comprising creating a plurality of term nodes in a learning graph, where particular term nodes correspond to a particular term from the plurality of terms in the organizational glossary.

3. The method of claim 1 further comprising:
performing text analysis on each of a plurality of received documents;
creating a content node in a learning graph for each of the plurality of received documents; and
creating an edge between particular content nodes and particular term nodes when the text analysis indicates that a particular document corresponding to a particular content node is relevant to a particular term node.

4. The method of claim 1, the algorithm comprising:
generating a plurality of unigrams corresponding to particular text documents based on a normalized term frequency in each particular text document;
and
merging the plurality of unigrams and the plurality of n-grams to form said organizational glossary specific to the particular organizational entity.

5. The method of claim 4 wherein generating a plurality of unigrams comprises filtering generic words and specific words from each particular document, wherein generic words are filtered out when a normalized term frequency for a particular word is greater than a first threshold and specific words are filtered out when the normalized term frequency for a particular word is less than a second threshold, and wherein the first threshold is greater than the second threshold.

6. The method of claim 4 wherein generating a plurality of n-grams comprises generating a plurality of bigrams comprising:
calculating a frequency of a plurality of consecutive two words from the plurality of text documents;
calculating expected values for particular pairs of words that co-occur together; and
selecting bigrams from the plurality of text documents that have a frequency greater than the expected value multiplied by a predefined factor such that a particular bigram is selected when an occurrence of the particular bigram is significantly greater than an occurrence of a first word of the particular bigram alone.

7. The method of claim 4 wherein generating a plurality of n-grams comprises generating a plurality of trigrams comprising:
calculating a frequency of a plurality of consecutive three words from the plurality of text documents;
calculating expected values for particular consecutive three words that co-occur together; and
selecting trigrams from the plurality of text documents that have a frequency greater than the expected value multiplied by a predefined factor such that a particular trigram is selected when an occurrence of the particular trigram is significantly greater than an occurrence of a first word and a second word of the particular trigram without a third word of the particular trigram.

8. The method of claim 4 wherein said normalized term frequency-inverse document frequency calculation is performed in parallel with said generating the plurality of unigrams.

9. The method of claim 4 further comprising selecting bigrams and trigrams, said selecting comprising:
comparing a number of co-occurrences of a particular three words in a plurality of trigrams with a number of co-occurrences of a first word and a second word of the particular three words in a plurality of bigrams; and
comparing the number of co-occurrences of particular three word trigrams with a number of co-occurrences of the second word and a third word of the particular three word trigram in the plurality of bigrams.

10. The method of claim 4 wherein preprocessing comprises:
stemming a first plurality of the words;
lemmatizing a second plurality of the words; and
eliminating one or more of punctuations, numbers, verbs, and compounds comprising prepositions and determiners.

11. The method of claim 1 further comprising eliminating stop words, wherein the stop words are customized for the particular organization entity by removing predefined acronyms for the particular organization entity from the stop words.

12. The method of claim 1 wherein the plurality of text documents are unstructured or semistructured documents having a plurality of different document types.

13. The method of claim 1 wherein the plurality of text documents comprise job profiles for the particular organizational entity.

14. The method of claim 1 wherein the plurality of text documents comprise job descriptions for the particular organizational entity.

15. A computer system comprising:
one or more processors; and
a non-transitory computer readable medium having stored thereon one or more programs, which when executed by the one or more processors, causes the one or more processors to:
receive a plurality of text documents, the text documents corresponding to a organizational entity;
extract a plurality terms from the plurality of text documents according to an algorithm configured to identify terms relevant to the organizational entity; and
generate an organizational glossary specific to the organizational entity, the organizational glossary comprising the plurality of terms relevant to the organizational entity,
wherein the algorithm causes the one or more processors to preprocess the plurality of text documents into a plurality of words and generate a plurality of n-grams for the plurality of text documents based on a normalized term frequency-inverse document frequency calculated across the plurality of text documents.

16. The computer system of claim 15, wherein the programs further cause the one or more processors to create a plurality of term nodes in a learning graph, where particular term nodes correspond to a particular term from the plurality of terms in the organizational glossary.

17. The computer system of claim 15 wherein the algorithm causes the one or more processors to:

generate a plurality of unigrams corresponding to particular text documents based on a normalized term frequency in each particular text document; and merging the plurality of unigrams and the plurality of n-grams to form said organizational glossary specific to the particular organizational entity.

18. A non-transitory computer readable storage medium storing one or more programs, the one or more programs comprising instructions for:

receiving a plurality of text documents, the text documents corresponding to a organizational entity;

extracting a plurality terms from the plurality of text documents according to an algorithm configured to identify terms relevant to the organizational entity; and generating an organizational glossary specific to the particular organizational entity, the organizational glossary comprising the plurality of terms relevant to the organizational entity, wherein the instructions for extracting the plurality of terms according to the algorithm include preprocessing the plurality of text documents into a plurality of words and generating a plurality of n-grams for the plurality of text documents based on a normalized term frequency-inverse document frequency calculated across the plurality of text documents.

19. The non-transitory computer readable storage medium of claim 18 further comprising instructions for creating a plurality of term nodes in a learning graph, where particular term nodes correspond to a particular term from the plurality of terms in the organizational glossary.

20. The non-transitory computer readable storage medium of claim 18, the instructions for the algorithm comprising:

generating a plurality of unigrams corresponding to particular text documents based on a normalized term frequency in each particular text document; and merging the plurality of unigrams and the plurality of n-grams to form said organizational glossary specific to the particular organizational entity.

* * * * *